(12) United States Patent
Inagaki et al.

(10) Patent No.: US 10,544,852 B2
(45) Date of Patent: Jan. 28, 2020

(54) DAMPING VALVE AND DAMPER

(71) Applicant: KYB Corporation, Tokyo (JP)

(72) Inventors: Yasuhiro Inagaki, Aichi (JP); Atsushi Sakuta, Kanagawa (JP)

(73) Assignee: KYB Corporation, Tokyo (JP)

( * ) Notice: Subject to any disclaimer, the term of this patent is extended or adjusted under 35 U.S.C. 154(b) by 190 days.

(21) Appl. No.: 15/528,957

(22) PCT Filed: Nov. 12, 2015

(86) PCT No.: PCT/JP2015/081900
§ 371 (c)(1),
(2) Date: May 23, 2017

(87) PCT Pub. No.: WO2016/084621
PCT Pub. Date: Jun. 2, 2016

(65) Prior Publication Data
US 2017/0268595 A1    Sep. 21, 2017

(30) Foreign Application Priority Data

Nov. 25, 2014 (JP) .................................. 2014-237849

(51) Int. Cl.
| | |
|---|---|
| *F16F 9/516* | (2006.01) |
| *F16F 9/34* | (2006.01) |
| *F16F 9/46* | (2006.01) |
| *F16F 9/44* | (2006.01) |
| *B60G 17/06* | (2006.01) |

(52) U.S. Cl.
CPC ................ *F16F 9/516* (2013.01); *F16F 9/34* (2013.01); *F16F 9/446* (2013.01); *F16F 9/46* (2013.01); *B60G 17/06* (2013.01)

(58) Field of Classification Search
CPC .... F16F 9/516; F16F 9/446; F16F 9/34; F16F 9/46; B60G 17/06
See application file for complete search history.

(56) References Cited

U.S. PATENT DOCUMENTS

| | | | | |
|---|---|---|---|---|
| 3,194,262 | A * | 7/1965 | Hamilton | F16F 9/34 137/493 |
| 4,624,347 | A * | 11/1986 | Mourray | F16F 9/348 137/493.9 |
| 4,953,671 | A * | 9/1990 | Imaizumi | F16F 9/464 188/266.3 |

(Continued)

FOREIGN PATENT DOCUMENTS

JP    2001-12530 A    1/2001

*Primary Examiner* — Paul N Dickson
*Assistant Examiner* — Timothy Wilhelm
(74) *Attorney, Agent, or Firm* — Rabin & Berdo, P.C.

(57) ABSTRACT

A damping valve includes a valve disc, a ring-shaped leaf valve, and a biasing mechanism. The valve disc includes a passage and a valve seat. The valve seat surrounds an exit end of the passage. The leaf valve is stacked on the valve disc. The leaf valve separates from and is seated on the valve seat to open and close the passage. The biasing mechanism causes a variable biasing force to act on the leaf valve to the valve disc side. The entire leaf valve is configured to axially retreat with respect to the valve disc. A clearance is formed between the leaf valve and the valve seat in a state in which the leaf valve is stacked on the valve disc with no load.

8 Claims, 4 Drawing Sheets

(56) References Cited

U.S. PATENT DOCUMENTS

| | | | | |
|---|---|---|---|---|
| 5,129,488 | A * | 7/1992 | Furuya | B60G 17/08 188/282.6 |
| 5,441,133 | A * | 8/1995 | Murakami | F16F 9/348 188/282.5 |
| 5,655,633 | A * | 8/1997 | Nakadate | F16F 9/467 188/266.6 |
| 6,089,142 | A * | 7/2000 | Adrian | F16F 9/3484 92/181 P |
| 6,371,262 | B1 * | 4/2002 | Katou | F16F 9/465 188/266.5 |
| 6,668,986 | B2 * | 12/2003 | Moradmand | F16F 9/466 188/266.2 |
| 6,782,980 | B2 * | 8/2004 | Nakadate | F16F 9/3214 188/313 |
| 6,860,370 | B2 * | 3/2005 | Nakadate | F16F 9/3485 188/282.5 |
| 7,104,180 | B2 * | 9/2006 | Hall | B60G 17/0152 91/422 |
| 8,042,661 | B2 * | 10/2011 | Ota | F16F 9/3485 188/282.5 |
| 8,167,101 | B2 * | 5/2012 | Chikamatsu | F16F 9/5126 188/313 |
| 8,297,418 | B2 * | 10/2012 | Bombrys | B60G 13/08 188/275 |
| 8,794,407 | B2 * | 8/2014 | Vanbrabant | F16F 9/464 188/282.1 |
| 8,800,729 | B2 * | 8/2014 | Yabe | F16F 9/465 188/266.6 |
| 9,022,187 | B2 * | 5/2015 | Murata | F16F 6/00 188/322.14 |
| 9,067,471 | B2 * | 6/2015 | Tuts | F16F 9/348 |
| 9,228,631 | B2 * | 1/2016 | Kiyonaga | F16F 9/3485 |
| 9,500,251 | B2 * | 11/2016 | Rummel | F16F 9/18 |
| 9,593,735 | B2 * | 3/2017 | Slusarczyk | F16F 9/34 |
| 9,810,280 | B2 * | 11/2017 | Hagidaira | F16F 9/34 |
| 9,834,054 | B2 * | 12/2017 | Teraoka | F16F 9/5126 |
| 9,845,839 | B2 * | 12/2017 | Rummel | F16F 9/18 |
| 2005/0133320 | A1 | 6/2005 | Fujita et al. | |

* cited by examiner

DAMPING VALVE AND DAMPER

TECHNICAL FIELD

The present invention relates to and damping valve and a damper.

BACKGROUND ART

Some dampers used for a suspension of a vehicle include a damping valve configured to change a damping force. As such damper, there has been known the following damper. The damper includes a cylinder, a piston that partitions an inside of the cylinder into an extension-side chamber and a contraction-side chamber, a piston rod whose one end is coupled to the piston and is movably inserted into the cylinder, and damping valves. The damping valves include passages that allow communication between an extension-side chamber and a contraction-side chamber provided in the piston, disc valves that separate from and are seated on ring-shaped valve seats, which surround exit ends of the passages provided in the piston to open and close these passages, back-pressure chambers that cause a pressure led from the extension-side chamber or the contraction-side chamber to act on back surfaces of the disc valves, and electromagnetic pressure control valves using a solenoid to control a pressure in the back-pressure chambers (for example, see JP2001-12530A).

The damper thus configured can control a damping force during extension and contraction by controlling the pressure in the back-pressure chambers by the electromagnetic pressure control valves. However, in a valve-closed state where the disc valves are seated on the valve seats, liquid passes through fixed orifices provided at the disc valves to come and go between the extension-side chamber and the contraction-side chamber. In view of this, when the piston moves at a low speed, the damper mainly provides the damping force by the fixed orifices.

SUMMARY OF INVENTION

Considering a ride comfort in a vehicle with a damper for vehicle, the damping force with soft damping force characteristics is preferably reduced as much as possible. However, the conventional damper provides the damping force by the fixed orifice until the disc valve enters a valve-opening state where the disc valve separates from the valve seat. Therefore, it is necessary to increase an opening area of the fixed orifice to reduce the damping force. Increasing the opening area of the fixed orifice can reduce the damping force. However, since a maximum value of the damping force is determined by the fixed orifice, a damping force adjustment width is significantly limited.

The damping force adjustment width can be increased without an orifice. However, even with the soft damping force, the damping force cannot be sufficiently reduced, degrading the ride comfort in the vehicle.

An object of the present invention is to provide a damping valve and a damper that can reduce a damping force with the soft damping force characteristics and enlarge the damping force adjustment width.

According to one aspect of the present invention, a damping valve includes: a valve disc that includes a passage and a valve seat, the valve seat surrounding an exit end of the passage; a ring-shaped leaf valve stacked on the valve disc, the leaf valve separating from and being seated on the valve seat to open and close the passage; and a biasing mechanism configured to cause a variable biasing force to act on the leaf valve toward the valve disc side. The entire leaf valve is configured to axially retreat with respect to the valve disc. A clearance is formed between the leaf valve and the valve seat in a state in which the leaf valve is stacked on the valve disc with no load.

DESCRIPTION OF EMBODIMENTS

The following describes an embodiment of the present invention with reference to the attached drawings.

Figure 1:
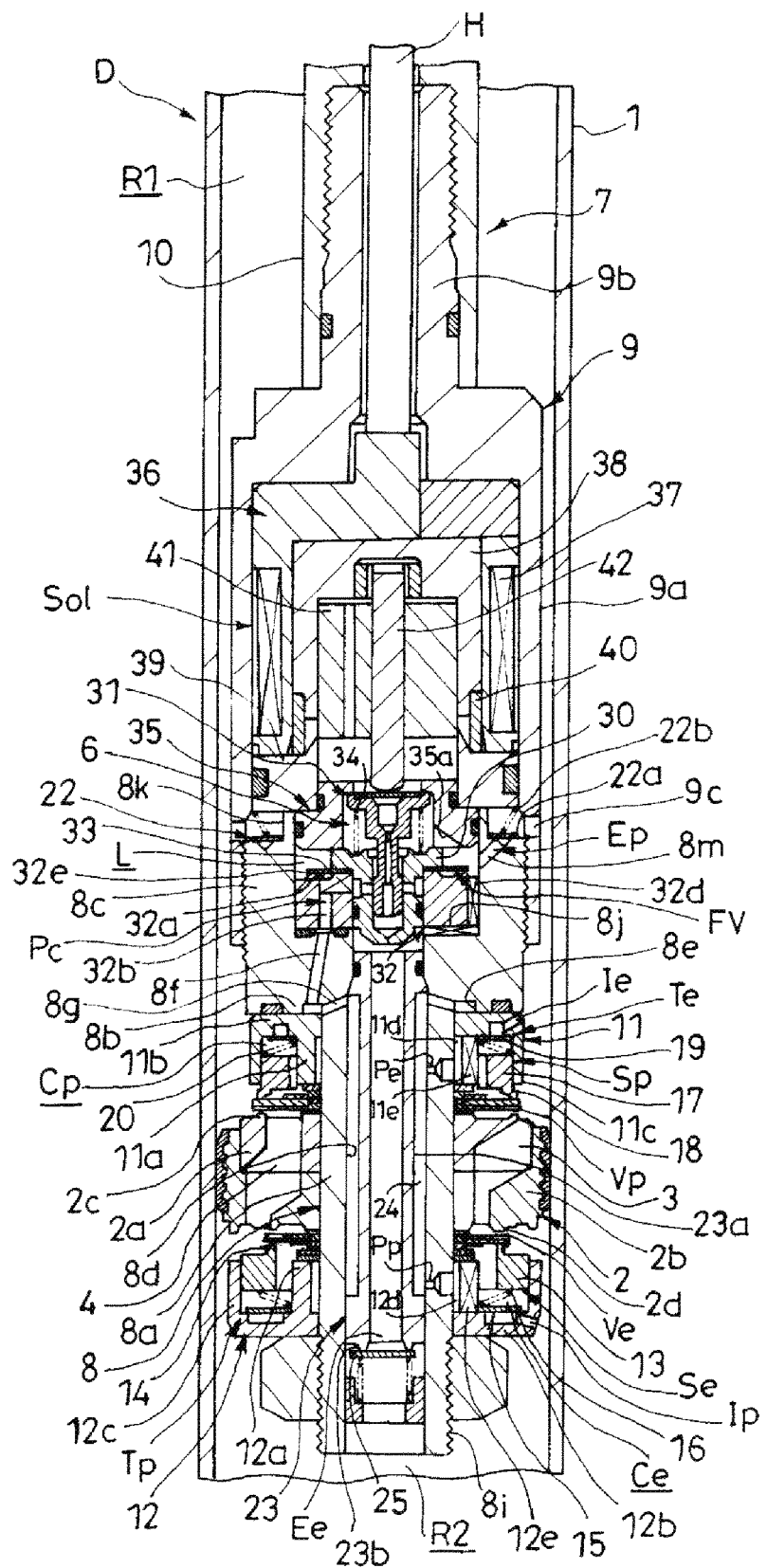
FIG. 1 is a cross-sectional view of a damper that applies a damping valve according to an embodiment of the present invention.

As illustrated in FIG. 1, a damping valve according to the embodiment of the present invention is applied to both an extension-side damping valve and a contraction-side damping valve of a damper D. The damping valve includes a piston 2, a ring-shaped extension-side leaf valve Ve, a ring-shaped contraction-side leaf valve Vp, and a biasing mechanism. The piston 2 as a valve disc includes an extension-side passage 3 and a contraction-side passage 4 as passages, and ring-shaped extension-side valve seat 2d and contraction-side valve seat 2c. The extension-side valve seat 2d and the contraction-side valve seat 2c surround respective exit ends of this extension-side passage 3 and this contraction-side passage 4. The extension-side leaf valve Ve is stacked on the piston 2. The extension-side leaf valve Ve separates from and is seated on the extension-side valve seat 2d to open and close the extension-side passage 3. The contraction-side leaf valve Vp is stacked on the piston 2. The contraction-side leaf valve Vp separates from and is seated on the contraction-side valve seat 2c to open and close the contraction-side passage 4. The biasing mechanism causes a variable biasing force to act on the extension-side leaf valve Ve to the piston 2 side and causes the variable biasing force to act on the contraction-side leaf valve Vp to the piston 2 side. The damping valve may be applied to only the extension-side damping valve or to only the contraction-side damping valve of the damper D.

The damper D includes a cylinder 1 filled with liquid such as a hydraulic oil, the above-described damping valve housed in the cylinder 1, the piston 2 slidably inserted into the cylinder 1, an extension-side chamber R1 and a contraction-side chamber R2 partitioned by the piston 2 in the cylinder 1, and a piston rod 7 movably inserted into the cylinder 1 and coupled to the piston 2. When the piston 2 moves in an axis direction, which is a vertical direction in FIG. 1, with respect to the cylinder 1, the damper D imparts a resistance to a flow of the liquid passing through the extension-side passage 3 by the extension-side leaf valve Ve. Meanwhile, the damper D imparts the resistance to a flow of the liquid passing through the contraction-side passage 4 by the contraction-side leaf valve Vp, thus providing a damping force.

It should be noted that, although not illustrated, a free piston that slides on an inside of the cylinder 1 is provided at the lower side of the cylinder 1 in FIG. 1. The free piston defines a gas chamber inside the cylinder 1. An other end of the piston rod 7 whose one end is coupled to the piston 2 penetrates an inner peripheral of a ring-shaped rod guide (not illustrated), which is provided at an upper end portion of the cylinder 1, and projects to an outside of the cylinder 1.

It should be noted that, a seal (not illustrated) is provided between the piston rod 7 and the cylinder 1. The seal liquid tightly seals the inside of the cylinder 1. Since the damper D is a so-called single-rod type, a volume of the piston rod 7 that moves into and out of the cylinder 1 in association with extension and contraction of the damper D is compensated when a volume of gas inside the gas chamber extends or contracts and the free piston vertically moves the inside of the cylinder 1. Although the damper D is a mono-tube type, instead of a configuration of disposing the free piston and the gas chamber, a reservoir may be provided at an outer periphery and the outside of the cylinder 1 to compensate the volume of the piston rod 7 by this reservoir.

The biasing mechanism of the damping valve includes an extension-side spool Se, an extension-side back-pressure chamber Ce, a contraction-side spool Sp, a contraction-side back-pressure chamber Cp, a communication passage 24, an extension-side pressure introduction passage Ie, a contraction-side pressure introduction passage Ip, an adjustment passage Pc, a contraction-side discharge passage Ep, an extension-side discharge passage Ee, and an electromagnetic pressure control valve 6. The extension-side spool Se biases the extension-side leaf valve Ve. The extension-side back-pressure chamber Ce presses the extension-side spool Se by internal pressure. The contraction-side spool Sp biases the contraction-side leaf valve Vp. The contraction-side back-pressure chamber Cp presses the contraction-side spool Sp by internal pressure. The communication passage 24 is communicated with the contraction-side back-pressure chamber Cp via an extension-side pilot orifice Pe, which is an extension-side resistance element imparting a resistance to the flow of passing liquid. The communication passage 24 is communicated with the extension-side back-pressure chamber Ce via a contraction-side pilot orifice Pp, which is a contraction-side resistance element imparting the resistance to the flow of passing liquid. The extension-side pressure introduction passage Ie accepts only the flow of liquid heading from the extension-side chamber R1 to the contraction-side back-pressure chamber Cp. The contraction-side pressure introduction passage Ip accepts only the flow of liquid heading from the contraction-side chamber R2 to the extension-side back-pressure chamber Ce. The adjustment passage Pc is connected to the communication passage 24. The contraction-side discharge passage Ep allows communication between a downstream of the adjustment passage Pc and the extension-side chamber R1. The contraction-side discharge passage Ep accepts only the flow of liquid heading from the adjustment passage Pc to the extension-side chamber R1. The extension-side discharge passage Ee allows communication between the downstream of the adjustment passage Pc and the contraction-side chamber R2. The extension-side discharge passage Ee accepts only the flow of liquid heading from the adjustment passage Pc to the contraction-side chamber R2. The electromagnetic pressure control valve 6 is provided at the adjustment passage Pc to control an upstream pressure of the adjustment passage Pc.

The following describes details of the damping valve and the damper D. The piston rod 7 includes a piston holding member 8, an electromagnetic valve housing tube 9, and a rod member 10. The piston holding member 8 holds the piston 2. One end of the electromagnetic valve housing tube 9 is coupled to the piston holding member 8 to form a hollow housing portion L, which houses the electromagnetic pressure control valve 6, together with the piston holding member 8. One end of the rod member 10 is coupled to the electromagnetic valve housing tube 9, and the other end projects from an upper end of the cylinder 1 to the outside.

The piston holding member 8 includes a holding shaft 8a, a flange 8b, and a tubular socket 8c. The ring-shaped piston 2 is mounted to an outer periphery of the holding shaft 8a. The flange 8b is provided at an outer periphery on an upper end of the holding shaft 8a in FIG. 1. The socket 8c is provided at an outer periphery on an upper end of the flange 8b in FIG. 1. The piston holding member 8 also includes a vertical hole 8d, a ring groove 8e, a port 8f, a horizontal hole 8g, the extension-side pilot orifice Pe and the contraction-side pilot orifice Pp, a threaded portion 8i, and a groove 8j. The vertical hole 8d opens to a distal end of the holding shaft 8a, axially extends, and runs to the inside of the socket 8c. The ring groove 8e is provided at a lower end of the flange 8b in FIG. 1 so as to surround the holding shaft 8a. The port 8f allows communication between the ring groove 8e and the inside of the socket 8c. The horizontal hole 8g allows communication between the ring groove 8e and the inside of the vertical hole 8d. The extension-side pilot orifice Pe and the contraction-side pilot orifice Pp open to an outer periphery of the holding shaft 8a and run to the vertical hole 8d. The threaded portion 8i is provided at an outer periphery on a lower end of the holding shaft 8a in FIG. 1. The groove 8j is formed at an upper end of the flange 8b and runs to the vertical hole 8d.

A tubular separator 23 is inserted into the vertical hole 8d provided on the holding shaft 8a. The separator 23 forms the communication passage 24 to allow communication between the extension-side pilot orifice Pe and the contraction-side pilot orifice Pp at the inside of the vertical hole 8d using a ring groove 23a provided on the outer periphery. A ring-shaped valve seat 23b is provided at a lower end of the separator 23 in FIG. 1 so as to surround an opening at the lower end. The vertical hole 8d allows communication between the contraction-side chamber R2 and the inside of the socket 8c through a passage inside the separator 23. The extension-side pilot orifice Pe and the contraction-side pilot orifice Pp are configured not to communicate with the contraction-side chamber R2 and the inside of the socket 8c at the inside of the vertical hole 8d by the separator 23. Furthermore, the horizontal hole 8g also runs to the communication passage 24. This horizontal hole 8g also does not communicate with the contraction-side chamber R2 and the inside of the socket 8c at the inside of the vertical hole 8d by the separator 23.

It should be noted that, as long as the resistance can be imparted to the flow of passing liquid, the extension-side resistance element and the contraction-side resistance element may be any configuration. The extension-side resistance element and the contraction-side resistance element are not limited to the orifice but may be a throttle such as a choke passage, and may be a valve to impart the resistance, such as a leaf valve and a poppet valve.

A ring-shaped concave portion 8k is provided at an outer periphery on the upper end of the socket 8c in FIG. 1. The socket 8c includes a through-hole 8m running from the concave portion 8k to the inside of the socket 8c. A ring plate 22a is disposed at the concave portion 8k. The ring plate 22a is biased by a spring member 22*b* from upward in FIG. 1 to obstruct the through-hole 8*m*.

The electromagnetic valve housing tube 9 includes a tube housing portion 9*a* with topped tubular shape, a tubular coupling portion 9*b*, and a through hole 9*c*. The coupling portion 9*b* has an outer diameter smaller than that of the tube housing portion 9*a* and extends from a top of this tube housing portion 9*a* upward in FIG. 1. The through hole 9*c* opens to a side portion of the tube housing portion 9*a* and runs to an inside of the tube housing portion 9*a*. The socket 8*c* of the piston holding member 8 is screwed with an inner peripheral of the tube housing portion 9*a* of the electromagnetic valve housing tube 9, thus integrating the electromagnetic valve housing tube 9 and the piston holding member 8. The electromagnetic valve housing tube 9 and the piston holding member 8 form the housing portion L that houses the electromagnetic pressure control valve 6. The housing portion L internally includes a part of the adjustment passage Pc, which will be described later. The housing portion L is communicated with the communication passage 24 through the port 8*f*, the ring groove 8*e*, and the horizontal hole 8*g*. These port 8*f*, ring groove 8*e*, and horizontal hole 8*g* form a part of the adjustment passage Pc. It should be noted that, the passages to allow communication between the housing portion L and the communication passage 24 are not limited to the port 8*f*, the ring groove 8*e*, and the horizontal hole 8*g*. For example, the passage may be a passage that directly allows communication between the housing portion L and the communication passage 24. The use of the port 8*f*, the ring groove 8*e*, and the horizontal hole 8*g* as the passages to allow communication between the housing portion L and the communication passage 24 eases processes on the passages.

Integrating the piston holding member 8 with the electromagnetic valve housing tube 9 arranges the through hole 9*c* to be opposed to the concave portion 8*k*. The through hole 9*c* serves as a passage to allow communication between the housing portion L and the extension-side chamber R1 together with the through-hole 8*m*. The ring plate 22*a* and the spring member 22*b*, which are provided on this passage, form a check valve 22 that accepts only a flow of liquid heading from the inside of the housing portion L to the extension-side chamber R1. Thus, the contraction-side discharge passage Ep is formed of the through hole 9*c*, the concave portion 8*k*, the through-hole 8*m*, and the check valve 22.

A check valve 25 is provided at the inside of the vertical hole 8*d* in the piston holding member 8. The check valve 25 separates from and is seated on the ring-shaped valve seat 23*b* provided at the lower end of the separator 23 in FIG. 1. The check valve 25 blocks the flow of liquid heading from the contraction-side chamber R2 side to the housing portion L and accepts only the flow of liquid heading from the housing portion L to the contraction-side chamber R2. The extension-side discharge passage Ee is formed inside the vertical hole 8*d*.

The rod member 10 includes a threaded portion, which is provided at the lower end in FIG. 1, screwed with a coupling portion 9*b* of the electromagnetic valve housing tube 9. Thus, integrating the rod member 10, the electromagnetic valve housing tube 9, and the piston holding member 8 forms the piston rod 7.

It should be noted that, a harness H is inserted through the inside of the rod member 10 and the inside of the coupling portion 9*b* of the electromagnetic valve housing tube 9. The harness H supplies a solenoid, which will be described later, with electric power. An upper end of the harness H extends from the upper end of the rod member 10 to the outside and is coupled to a power supply and a controller.

Figure 3:
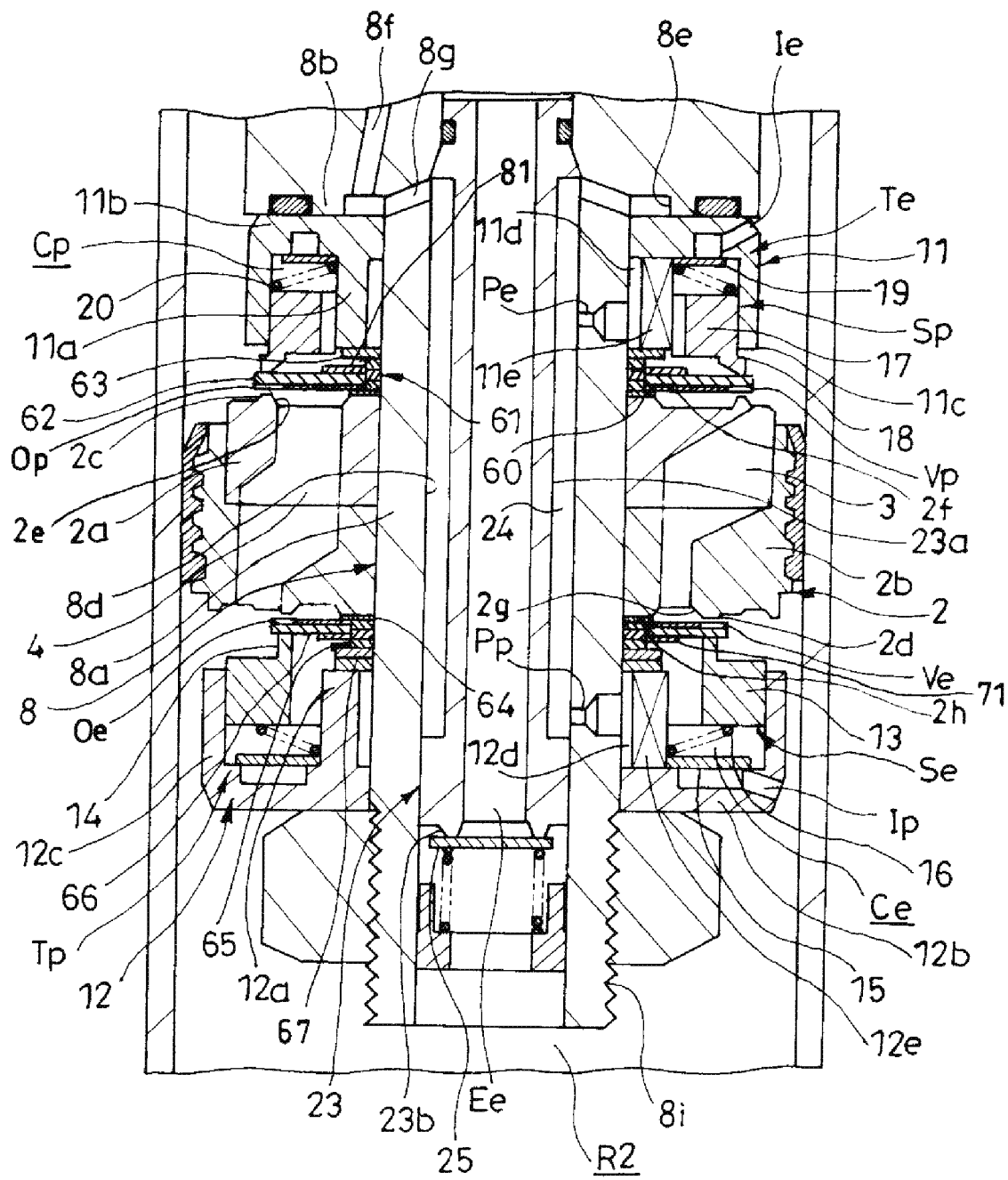
FIG. 3 is an enlarged cross-sectional view of the damping valve according to the embodiment of the present invention.

As illustrated in FIG. 3, a contraction-side ring spacer 60 as a ring-shaped spacer, a collar 61 as a shaft member, the ring-shaped contraction-side leaf valve Vp, a contraction-side ring plate 62 as a ring plate, a contraction-side stopper 63, and a contraction-side chamber 11 are attached to an upper side of the piston 2 in FIG. 3 and an outer periphery of the holding shaft 8*a* provided at the piston holding member 8 together with the ring-shaped piston 2. The collar 61 is configured by stacking a plurality of ring plates with a circular outer shape. The contraction-side leaf valve Vp is slidably mounted to an outer periphery of the collar 61. The contraction-side ring plate 62 is slidably mounted to the outer periphery of the collar 61. The contraction-side chamber 11 forms the contraction-side back-pressure chamber Cp and accommodates the contraction-side spool Sp. An extension-side ring spacer 64 as a ring-shaped spacer, a collar 65 as a shaft member, a ring-shaped extension-side leaf valve Ve, an extension-side ring plate 66 as a ring plate, an extension-side stopper 67, and an extension-side chamber 12 are attached to a lower side of the piston 2 in FIG. 3 and an outer periphery of the ring-shaped holding shaft 8*a*. The collar 65 is configured by stacking a plurality of ring plates with a circular outer shape. The extension-side leaf valve Ve is slidably mounted to an outer periphery of the collar 65. The extension-side ring plate 66 is slidably mounted to an outer periphery of the collar 65. The extension-side chamber 12 forms the extension-side back-pressure chamber Ce and accommodates the extension-side spool Se.

The piston 2 is formed by laminating discs 2*a* and 2*b* divided into two, upper and lower. The piston 2 internally includes the extension-side passage 3 and the contraction-side passage 4 to allow communication between the extension-side chamber R1 and the contraction-side chamber R2. Thus, the discs 2*a* and 2*b*, which are vertically divided, form the piston 2. This allows forming the extension-side passage 3 and the contraction-side passage 4 with a complicated shape not by a drilling process, thereby ensuring manufacturing the piston 2 inexpensively and easily.

In FIG. 3, at an upper end of the upper side disc 2*a*, a ring window 2*e*, a ring-shaped contraction-side valve seat 2*c*, and an inner peripheral seat 2*f* are provided. The ring window 2*e* is communicated with the contraction-side passage 4. The contraction-side valve seat 2*c* is provided on an outer peripheral side of the ring window 2*e* and surrounds the contraction-side passage 4. The inner peripheral seat 2*f* is provided at an inner peripheral of the ring window 2*e*. At a lower end of the lower-side disc 2*b*, a ring window 2*g*, a ring-shaped extension-side valve seat 2*d*, and an inner peripheral seat 2*h* are provided. The ring window 2*g* is communicated with the extension-side passage 3. The extension-side valve seat 2*d* is provided on an outer peripheral side of the ring window 2*g* and surrounds the extension-side passage 3. The inner peripheral seat 2*h* is provided at an inner peripheral of the ring window 2*g*.

As illustrated in FIG. 3, the extension-side leaf valve Ve is formed into a ring shape so as to allow the holding shaft 8*a* of the piston holding member 8 to be inserted through. The extension-side leaf valve Ve is constituted of one ring plate. The extension-side leaf valve Ve may be constituted of a plurality of stacked ring plates. The extension-side leaf valve Ve thus configured is stacked on the lower side of the piston 2 in FIG. 3 via the extension-side ring spacer 64, which is stacked on the inner peripheral seat 2*h* of the piston 2. The extension-side leaf valve Ve includes a cutout Oe, which functions as an orifice when the extension-side leaf valve Ve is seated on the extension-side valve seat 2d, on the outer periphery. The extension-side leaf valve Ve is slidably mounted to the outer periphery of the collar 65. The extension-side ring plate 66 stacked on the extension-side leaf valve Ve is slidably mounted to the outer periphery of the collar 65. A ring-shaped auxiliary valve 71, which has an outer diameter smaller than that of the extension-side ring plate 66, is stacked on a side opposite to the extension-side leaf valve Ve side of the extension-side ring plate 66. The auxiliary valve 71 is also slidably mounted to the outer periphery of the collar 65. An axial length when the extension-side leaf valve Ve, the extension-side ring plate 66, and the auxiliary valve 71 are stacked is configured shorter than an axial length of the collar 65. The ring-shaped extension-side stopper 67 is provided on the lower side of the collar 65 in FIG. 3. An outer diameter of the extension-side stopper 67 is configured larger than inner diameters of the auxiliary valve 71 and the extension-side ring plate 66. The extension-side chamber 12, which will be described later, is disposed on the lower side of the extension-side stopper 67. The collar 65 as the shaft member guides the extension-side leaf valve Ve, the extension-side ring plate 66, and the auxiliary valve 71. The extension-side leaf valve Ve, the extension-side ring plate 66, and the auxiliary valve 71 can move vertically, an axis direction, in FIG. 3 between the extension-side ring spacer 64 and the extension-side stopper 67.

That is, pressing the extension-side leaf valve Ve by pressure from the extension-side passage 3 side warps an outer periphery of the extension-side leaf valve Ve together with the extension-side ring plate 66. Additionally, the extension-side leaf valve Ve can retreat from the piston 2 together with the extension-side ring plate 66 and the auxiliary valve 71. An amount of retreat of the extension-side leaf valve Ve, the extension-side ring plate 66, and the auxiliary valve 71 from the piston 2 is configured by the axial length of the collar 65. Since the collar 65 is constituted of the plurality of ring plates, changing the number of stacked ring plates can adjust the axial length of the collar 65. The collar 65 is not limited to the plurality of ring plates but may be a single ring plate.

As described above, the extension-side leaf valve Ve is stacked on the lower side of the piston 2 in FIG. 3 via the extension-side ring spacer 64, which is stacked on the inner peripheral seat 2h of the piston 2. With a load not acting on the extension-side leaf valve Ve, a clearance is formed between the extension-side leaf valve Ve and the extension-side valve seat 2d. The vertical length of this clearance in FIG. 3 can be adjusted by exchanging the extension-side ring spacer 64 with one with different thickness or changing the number of the stacked extension-side ring spacers 64. It should be noted that, the clearance between the extension-side leaf valve Ve and the extension-side valve seat 2d can also be formed as follows. A height of the inner peripheral seat 2h is configured higher than a height of the extension-side valve seat 2d to do away with the extension-side ring spacer 64. The extension-side leaf valve Ve is directly stacked on the inner peripheral seat 2h. However, disposing the extension-side ring spacer 64 can easily adjust a size of the clearance.

An application of a biasing force from a side opposite to the piston 2, which is a back surface side, by the biasing mechanism warps the extension-side leaf valve Ve. An increase in biasing force causes the extension-side leaf valve Ve to be seated on the extension-side valve seat 2d to obstruct the extension-side passage 3. In this state, the extension-side passage 3 communicates with the contraction-side chamber R2 through only the cutout Oe.

Flexural rigidity of the extension-side ring plate 66 is configured higher than that of the extension-side leaf valve Ve. Therefore, the axial length (thickness) of the extension-side ring plate 66 is longer than the axial length (thickness) of the extension-side leaf valve Ve. The extension-side ring plate 66 may be made of a material with rigidity higher than that of the extension-side leaf valve Ve in addition to strengthening the rigidity by the axial length.

Here, the inner diameter of the extension-side ring plate 66 is configured to have a diameter smaller than an outer diameter of the inner peripheral seat 2h provided at the piston 2. An outer diameter of the extension-side ring plate 66 is configured larger than an inner diameter of the extension-side valve seat 2d. Then, when the extension-side ring plate 66 is pressed from the back surface side by the pressure in the extension-side back-pressure chamber Ce and the extension-side spool Se, the extension-side ring plate 66 presses up and warps the extension-side leaf valve Ve to the upper side in FIG. 3. When the extension-side leaf valve Ve warps to be seated on the extension-side valve seat 2d, since the inner and outer diameters of the extension-side ring plate 66 are configured as described above, the extension-side ring plate 66 is supported by the inner peripheral seat 2h and the extension-side valve seat 2d. In view of this, the extension-side ring plate 66 receives the pressure in the extension-side back-pressure chamber Ce and the biasing force by the extension-side spool Se. An overload does not act on the extension-side leaf valve Ve, thereby reducing a deformation of the extension-side leaf valve Ve more than that.

An outer diameter of the auxiliary valve 71 is configured smaller than those of the extension-side leaf valve Ve and the extension-side ring plate 66. Accordingly, in the case where the extension-side leaf valve Ve and the extension-side ring plate 66 warp by the pressure of the extension-side passage 3, outer peripheral sides of the extension-side leaf valve Ve and the extension-side ring plate 66 with respect to the auxiliary valve 71 are likely to warp. Changing the outer diameter of the auxiliary valve 71 allows tuning the damping force characteristics of the extension-side damping force. When the auxiliary valve 71 is unnecessary because of the damping force characteristics generated in the damper D, the auxiliary valve 71 may be done away. As necessary, the plurality of auxiliary valves 71 may be stacked.

The extension-side chamber 12 includes a tubular mounting portion 12a, a flange portion 12b, a sliding-contact tube 12c, a ring groove 12d, and a cutout 12e. The mounting portion 12a is fitted to an outer periphery of the holding shaft 8a of the piston holding member 8. The flange portion 12b is provided at an outer periphery on a lower end of the mounting portion 12a in FIG. 3. The sliding-contact tube 12c extends from the outer periphery of the flange portion 12b to the piston 2 side. The ring groove 12d is provided on the inner peripheral of the mounting portion 12a. The cutout 12e runs from the outer periphery of the mounting portion 12a to the ring groove 12d. With the extension-side chamber 12 attached to the holding shaft 8a, the ring groove 12d is opposed to the contraction-side pilot orifice Pp provided at the holding shaft 8a. The extension-side stopper 67 is interposed between the mounting portion 12a of the extension-side chamber 12 and the collar 65. The extension-side stopper 67 may be done away and the mounting portion 12a may be caused to function as a stopper to restrict a lower limit of the movement of the extension-side ring plate 66. It should be noted that, to attach the extension-side chamber 12 to the holding shaft 8a of the piston holding member 8, in the case where a position of the extension-side chamber 12 with respect to the piston holding member 8 needs to be adjusted such that the contraction-side pilot orifice Pp is opposed to the ring groove 12d, changing the thickness and the number of extension-side stoppers 67 can easily adjust the position of the extension-side chamber 12.

The extension-side spool Se is housed in the sliding-contact tube 12c. The outer periphery of the extension-side spool Se is slidably in contact with the inner peripheral of the sliding-contact tube 12c, thereby ensuring the axial movement of the extension-side spool Se in the sliding-contact tube 12c. The extension-side spool Se includes a ring-shaped spool body 13 and a ring projection 14. The ring projection 14 stands upright from an inner peripheral on the upper end of the spool body 13 in FIG. 3. An inner diameter of the ring projection 14 is configured smaller than an outer diameter of the extension-side ring plate 66. The ring projection 14 can abut on a lower surface, a back surface, of the extension-side ring plate 66 in FIG. 3.

Attaching the extension-side chamber 12 into which the extension-side spool Se is inserted to the holding shaft 8a forms the extension-side back-pressure chamber Ce on the lower side in FIG. 3, which is the back surface side of the extension-side leaf valve Ve. It should be noted that, the inner diameter of the spool body 13 may be configured to have a diameter slidably in contact with the outer periphery of the mounting portion 12a to partition the extension-side back-pressure chamber Ce by the extension-side spool Se and the extension-side chamber 12.

With the extension-side chamber 12 attached to the holding shaft 8a, the ring groove 12d is opposed to the contraction-side pilot orifice Pp provided at the holding shaft 8a. Accordingly, the extension-side back-pressure chamber Ce communicates with the contraction-side pilot orifice Pp through the cutout 12e and the ring groove 12d.

Furthermore, the extension-side chamber 12 includes the contraction-side pressure introduction passage Ip opening to an outer periphery of the flange portion 12b. The contraction-side pressure introduction passage Ip is a communication passage that allows communication between the contraction-side chamber R2 and the extension-side back-pressure chamber Ce. A ring plate 15 is stacked on the upper side of the flange portion 12b of the extension-side chamber 12 in FIG. 3. The ring plate 15 is pressed to the flange portion 12b by a spring member 16 interposed between the spool body 13 and the ring plate 15 and obstructs the contraction-side pressure introduction passage Ip. The contraction-side pressure introduction passage Ip is designed so as not to impart the resistance to the flow of passing liquid.

With the damper D in the contraction operation, the ring plate 15 is pressed by the pressure of the contraction-side chamber R2 higher than that of the extension-side back-pressure chamber Ce and separates from the flange portion 12b to open the contraction-side pressure introduction passage Ip. With the damper D in the extension operation, the ring plate 15 is pressed to the flange portion 12b by the pressure in the extension-side back-pressure chamber Ce higher than that of the contraction-side chamber R2 to obstruct the contraction-side pressure introduction passage Ip. Thus, the ring plate 15 functions as a valve element of a contraction-side check valve Tp accepting only the flow of liquid from the contraction-side chamber R2. Disposing the contraction-side check valve Tp configures the contraction-side pressure introduction passage Ip as a one-way passage that accepts only the flow of liquid heading from the contraction-side chamber R2 to the extension-side back-pressure chamber Ce.

The spring member 16, which presses the ring plate 15 to the flange portion 12b, constitutes the contraction-side check valve Tp together with the ring plate 15. The spring member 16 also plays a role in biasing the extension-side spool Se to the extension-side leaf valve Ve. Even if the warp of the extension-side leaf valve Ve is released after the extension-side leaf valve Ve warps and the extension-side spool Se is pressed down to the lower side in FIG. 3 in which the extension-side spool Se separates from the piston 2, since the extension-side spool Se is biased to the extension-side leaf valve Ve by the spring member 16, the extension-side spool Se follows the extension-side leaf valve Ve and quickly returns to an original position (a position illustrated in FIG. 3). It is also possible to bias the extension-side spool Se by a spring member different from the spring member 16. Meanwhile, sharing the spring member 16 with the contraction-side check valve Tp allows a reduction in the number of components and simplifying the structure. It should be noted that, the outer diameter of the extension-side spool Se is configured to have a diameter larger than that of the inner diameter of the ring projection 14 abutting on the extension-side ring plate 66. Accordingly, the extension-side spool Se is always biased to the extension-side leaf valve Ve by the pressure of the extension-side back-pressure chamber Ce.

As illustrated in FIG. 3, the contraction-side leaf valve Vp, which is stacked on the upper side of the piston 2, is formed into a ring shape so as to allow the holding shaft 8a of the piston holding member 8 to be inserted through, similar to the extension-side leaf valve Ve. The contraction-side leaf valve Vp is constituted of one ring plate. The contraction-side leaf valve Vp may be constituted of a plurality of stacked ring plates. The contraction-side leaf valve Vp thus configured is stacked on the upper side of the piston 2 in FIG. 3 via the contraction-side ring spacer 60, which is stacked on the inner peripheral seat 2f of the piston 2. The contraction-side leaf valve Vp includes a cutout Op, which functions as an orifice when the contraction-side leaf valve Vp is seated on the contraction-side valve seat 2c, on the outer periphery. The contraction-side leaf valve Vp is slidably mounted to the outer periphery of the collar 61. The contraction-side ring plate 62 stacked on the contraction-side leaf valve Vp is slidably mounted to the outer periphery of the collar 61. A ring-shaped auxiliary valve 81, which has an outer diameter smaller than that of the contraction-side ring plate 62, is stacked on a side opposite to the contraction-side leaf valve Vp side of the contraction-side ring plate 62. The auxiliary valve 81 is also slidably mounted to the outer periphery of the collar 61. An axial length when the contraction-side leaf valve Vp, the contraction-side ring plate 62, and the auxiliary valve 81 are stacked is configured shorter than an axial length of the collar 61. The ring-shaped contraction-side stopper 63 is provided on the upper side of the collar 61 in FIG. 3. An outer diameter of the contraction-side stopper 63 is configured larger than inner diameters of the auxiliary valve 81 and the contraction-side ring plate 62. The contraction-side chamber 11, which will be described later, is disposed on the upper side of the contraction-side stopper 63. The collar 61 as the shaft member guides the contraction-side leaf valve Vp, the contraction-side ring plate 62, and the auxiliary valve 81. The contraction-side leaf valve Vp, the contraction-side ring plate 62, and the auxiliary valve 81 can move vertically, the axis direction, in FIG. 3 between the contraction-side ring spacer 60 and the contraction-side stopper 63.

That is, pressing the contraction-side leaf valve Vp by pressure from the contraction-side passage 4 side warps an outer periphery of the contraction-side leaf valve Vp together with the contraction-side ring plate 62. Additionally, the contraction-side leaf valve Vp can retreat from the piston 2 together with the contraction-side ring plate 62 and the auxiliary valve 81. An amount of retreat of the contraction-side leaf valve Vp, the contraction-side ring plate 62, and the auxiliary valve 81 from the piston 2 is configured by the axial length of the collar 61. Since the collar 61 is constituted of the plurality of ring plates, changing the number of stacked ring plates can adjust the axial length of the collar 61. The collar 61 is not limited to the plurality of ring plates but may be a single ring plate.

As described above, the contraction-side leaf valve Vp is stacked on the upper side of the piston 2 in FIG. 3 via the contraction-side ring spacer 60, which is stacked on the inner peripheral seat 2f of the piston 2. With a load not acting on the contraction-side leaf valve Vp, a clearance is formed between the contraction-side leaf valve Vp and the contraction-side valve seat 2c. The vertical length of this clearance in FIG. 3 can be adjusted by exchanging the contraction-side ring spacer 60 with one with different thickness or changing the number of stacked contraction-side ring spacers 60. It should be noted that, the clearance between the contraction-side leaf valve Vp and the contraction-side valve seat 2c can also be formed as follows. A height of the inner peripheral seat 2f is configured higher than a height of the contraction-side valve seat 2c to do away with the contraction-side ring spacer 60. The contraction-side leaf valve Vp is directly stacked on the inner peripheral seat 2f. However, disposing the contraction-side ring spacer 60 can easily adjust a size of the clearance.

An application of a biasing force from a side opposite to the piston 2, which is a back surface side, by the biasing mechanism warps the contraction-side leaf valve Vp. An increase in biasing force causes the contraction-side leaf valve Vp to be seated on the contraction-side valve seat 2c to obstruct the contraction-side passage 4. In this state, the contraction-side passage 4 communicates with the extension-side chamber R1 through only the cutout Op.

Flexural rigidity of the contraction-side ring plate 62 is configured higher than that of the contraction-side leaf valve Vp. Therefore, the axial length (thickness) of the contraction-side ring plate 62 is longer than the axial length (thickness) of the contraction-side leaf valve Vp. The contraction-side ring plate 62 may be made of a material with rigidity higher than that of the contraction-side leaf valve Vp in addition to strengthening the rigidity by the axial length.

Here, the inner diameter of the contraction-side ring plate 62 is configured to have a diameter smaller than an outer diameter of the inner peripheral seat 2f provided at the piston 2. An outer diameter of the contraction-side ring plate 62 is configured larger than an inner diameter of the contraction-side valve seat 2c. Then, when the contraction-side ring plate 62 is pressed from the back surface side by the pressure in the contraction-side back-pressure chamber Cp and the contraction-side spool Sp, the contraction-side ring plate 62 presses down and warps the contraction-side leaf valve Vp to the lower side in FIG. 3. When the contraction-side leaf valve Vp warps to be seated on the contraction-side valve seat 2c, since the inner and outer diameters of the contraction-side ring plate 62 are configured as described above, the contraction-side ring plate 62 is supported by the inner peripheral seat 2f and the contraction-side valve seat 2c. In view of this, the contraction-side ring plate 62 receives the pressure in the contraction-side back-pressure chamber Cp and the biasing force by the contraction-side spool Sp. An overload does not act on the contraction-side leaf valve Vp, thereby reducing a deformation of the contraction-side leaf valve Vp more than that.

An outer diameter of the auxiliary valve 81 is configured smaller than those of the contraction-side leaf valve Vp and the contraction-side ring plate 62. Accordingly, in the case where the contraction-side leaf valve Vp and the contraction-side ring plate 62 warp by the pressure of the contraction-side passage 4, outer peripheral sides of the contraction-side leaf valve Vp and the contraction-side ring plate 62 with respect to the auxiliary valve 81 are likely to warp. Changing the outer diameter of the auxiliary valve 81 allows tuning the damping force characteristics of the contraction-side damping force. When the auxiliary valve 81 is unnecessary because of the damping force characteristics generated in the damper D, the auxiliary valve 81 may be done away. As necessary, the plurality of auxiliary valves 81 may be stacked.

The contraction-side chamber 11 includes a tubular mounting portion 11a, a flange portion 11b, a sliding-contact tube 11c, a ring groove 11d, and a cutout 11e. The mounting portion 11a is fitted to an outer periphery of the holding shaft 8a of the piston holding member 8. The flange portion 11b is provided at an outer periphery on an upper end of the mounting portion 11a in FIG. 3. The sliding-contact tube 11c extends from the outer periphery of the flange portion 11b to the piston 2 side. The ring groove 11d is provided on the inner peripheral of the mounting portion 11a. The cutout 11e runs from the outer periphery of the mounting portion 11a to the ring groove 11d. With the contraction-side chamber 11 attached to the holding shaft 8a, the ring groove 11d is opposed to the extension-side pilot orifice Pe provided at the holding shaft 8a. The contraction-side stopper 63 is interposed between the mounting portion 11a of the contraction-side chamber 11 and the collar 61. The contraction-side stopper 63 may be done away and the mounting portion 11a may be caused to function as a stopper to restrict an upper limit of the movement of the contraction-side ring plate 62. It should be noted that, to attach the contraction-side chamber 11 to the holding shaft 8a of the piston holding member 8, in the case where a position of the contraction-side chamber 11 with respect to the piston holding member 8 needs to be adjusted such that the extension-side pilot orifice Pe is opposed to the ring groove 11d, changing the thickness and the number of the contraction-side stoppers 63 can easily adjust the position of the contraction-side chamber 11.

The contraction-side spool Sp is housed in the sliding-contact tube 11c. The outer periphery of the contraction-side spool Sp is slidably in contact with the inner peripheral of the sliding-contact tube 11c, thereby ensuring the axial movement of the contraction-side spool Sp in the sliding-contact tube 11c. The contraction-side spool Sp includes a ring-shaped spool body 17 and a ring projection 18. The ring projection 18 stands upright from an outer peripheral on the lower end of the spool body 17 in FIG. 3. An inner diameter of the ring projection 18 is configured smaller than an outer diameter of the contraction-side ring plate 62. The ring projection 18 can abut on an upper surface, a back surface, of the contraction-side ring plate 62 in FIG. 3.

Attaching the contraction-side chamber 11 into which the contraction-side spool Sp is inserted to the holding shaft 8a forms the contraction-side back-pressure chamber Cp on the upper side in FIG. 3, which is the back surface side of the contraction-side leaf valve Vp. It should be noted that, the inner diameter of the spool body 17 may be configured to have a diameter slidably in contact with the outer periphery of the mounting portion 11a to partition the contraction-side back-pressure chamber Cp by the contraction-side spool Sp and the contraction-side chamber 11.

With the contraction-side chamber 11 attached to the holding shaft 8a, the ring groove 11d is opposed to the extension-side pilot orifice Pe provided at the holding shaft 8a. Accordingly, the contraction-side back-pressure chamber Cp communicates with the extension-side pilot orifice Pe through the cutout 11e and the ring groove 11d. When the contraction-side back-pressure chamber Cp runs to the extension-side pilot orifice Pe, the contraction-side back-pressure chamber Cp is communicated with the extension-side back-pressure chamber Ce through the communication passage 24, which is formed in the vertical hole 8d of the holding shaft 8a, and the contraction-side pilot orifice Pp.

Furthermore, the contraction-side chamber 11 includes the extension-side pressure introduction passage Ie opening to an outer periphery of the flange portion 11b. The extension-side pressure introduction passage Ie is a communication passage that allows communication between the extension-side chamber R1 and the contraction-side back-pressure chamber Cp. A ring plate 19 is stacked on the lower side of the flange portion 11b of the contraction-side chamber 11 in FIG. 3. The ring plate 19 is pressed to the flange portion 11b by a spring member 20 interposed between the spool body 17 and the ring plate 19 and obstructs the extension-side pressure introduction passage Ie. The extension-side pressure introduction passage Ie is designed so as not to impart the resistance to the flow of passing liquid.

With the damper D in the extension operation, the ring plate 19 is pressed by the pressure of the extension-side chamber R1 higher than that of the contraction-side back-pressure chamber Cp and separates from the flange portion 11b to open the extension-side pressure introduction passage Ie. With the damper D in the contraction operation, the ring plate 19 is pressed to the flange portion 11b by the pressure in the contraction-side back-pressure chamber Cp higher than that of the extension-side chamber R1 to obstruct the extension-side pressure introduction passage Ie. Thus, the ring plate 19 functions as a valve element of an extension-side check valve Te accepting only the flow of liquid from the extension-side chamber R1. Disposing the extension-side check valve Te configures the extension-side pressure introduction passage Ie as a one-way passage that accepts only the flow of liquid heading from the extension-side chamber R1 to the contraction-side back-pressure chamber Cp.

Here, as described above, the communication passage 24 is communicated with the inside of the housing portion L through the ring groove 8e, the port 8f, and the horizontal hole 8g provided at the piston holding member 8. Accordingly, the extension-side back-pressure chamber Ce and the contraction-side back-pressure chamber Cp are communicated with one another through the extension-side pilot orifice Pe, the contraction-side pilot orifice Pp, and the communication passage 24. The extension-side back-pressure chamber Ce and the contraction-side back-pressure chamber Cp are also communicated with the extension-side chamber R1 through the extension-side pressure introduction passage Ie, communicated with the contraction-side chamber R2 through the contraction-side pressure introduction passage Ip, and further communicated with the housing portion L through the port 8f and the horizontal hole 8g.

The spring member 20, which presses the ring plate 19 to the flange portion 11b, constitutes the extension-side check valve Te together with the ring plate 19. The spring member 20 also plays a role in biasing the contraction-side spool Sp to the contraction-side leaf valve Vp. Even if the warp of the contraction-side leaf valve Vp is released after the contraction-side leaf valve Vp warps and the contraction-side spool Sp is pressed up to the upper side in FIG. 3 in which the contraction-side spool Sp separates from the piston 2, since the contraction-side spool Sp is biased to the contraction-side leaf valve Vp by the spring member 20, the contraction-side spool Sp follows the contraction-side leaf valve Vp and quickly returns to an original position (a position illustrated in FIG. 3). It is also possible to bias the contraction-side spool Sp by a spring member different from the spring member 20. Meanwhile, sharing the spring member 20 with the extension-side check valve Te allows a reduction in the number of components and simplifying the structure. It should be noted that, the outer diameter of the contraction-side spool Sp is configured to have a diameter larger than that of the inner diameter of the ring projection 18 abutting on the contraction-side ring plate 62. Accordingly, the contraction-side spool Sp is always biased to the contraction-side leaf valve Vp by the pressure of the contraction-side back-pressure chamber Cp. Therefore, a spring member only to bias the contraction-side spool Sp may not be installed.

Receiving the pressure of the extension-side back-pressure chamber Ce, the extension-side spool Se biases the extension-side leaf valve Ve to the piston 2 via the extension-side ring plate 66. A pressure-receiving area of the extension-side spool Se, which receives the pressure of the extension-side back-pressure chamber Ce, is a difference between an area of a circle with an outer diameter of the extension-side spool Se as a diameter and an area of a circle with an inner diameter of the ring projection 14 as a diameter. Similarly, receiving the pressure of the contraction-side back-pressure chamber Cp, the contraction-side spool Sp biases the contraction-side leaf valve Vp to the piston 2 via the contraction-side ring plate 62. A pressure-receiving area of the contraction-side spool Sp, which receives the pressure of the contraction-side back-pressure chamber Cp, is a difference between an area of a circle with an outer diameter of the contraction-side spool Sp as a diameter and an area of a circle with an inner diameter of the ring projection 18 as a diameter. With the damper D, the pressure-receiving area of the extension-side spool Se is configured larger than the pressure-receiving area of the contraction-side spool Sp.

The ring projection 14 of the extension-side spool Se abuts on a back surface of the extension-side ring plate 66. An inner peripheral side of the extension-side ring plate 66 is mounted to an outer periphery of the collar 65. In view of this, the pressure-receiving area that the pressure of the extension-side back-pressure chamber Ce directly acts on the extension-side ring plate 66 is an area found by subtracting an area of a circle with the outer diameter of the collar 65 as a diameter from an area of a circle with the inner diameter of the ring projection 14 as a diameter. Accordingly, assume that a force of multiplying the area found by subtracting the area of the circle with the outer diameter of the collar 65 as the diameter from the area of the circle with the outer diameter of the extension-side spool Se as the diameter by the pressure of the extension-side back-pressure chamber Ce as an extension-side load. The extension-side leaf valve Ve is biased to the piston 2 by this extension-side load. It should be noted that, the extension-side ring plate 66 may be done away and the ring projection 14 may directly abut on the back surface of the extension-side leaf valve Ve. In this case as well, since the extension-side leaf valve Ve is mounted to the outer periphery of the collar 65, similar to the case where the extension-side ring plate 66 is provided, the extension-side load acts on the extension-side leaf valve Ve.

The ring projection 18 of the contraction-side spool Sp abuts on a back surface of the contraction-side ring plate 62. An inner peripheral side of the contraction-side ring plate 62 is mounted to an outer periphery of the collar 61. In view of this, the pressure-receiving area that the pressure of the contraction-side back-pressure chamber Cp directly acts on the contraction-side ring plate 62 is an area found by subtracting an area of a circle with the outer diameter of the collar 61 as a diameter from an area of a circle with the inner diameter of the ring projection 18 as a diameter. Accordingly, assume that a force of multiplying the area found by subtracting the area of the circle with the outer diameter of the collar 61 as the diameter from the area of the circle with the outer diameter of the contraction-side spool Sp as the diameter by the pressure of the contraction-side back-pressure chamber Cp as a contraction-side load. The contraction-side leaf valve Vp is biased to the piston 2 by this contraction-side load. It should be noted that, the contraction-side ring plate 62 may be done away and the ring projection 18 may directly abut on the back surface of the contraction-side leaf valve Vp. In this case as well, since the contraction-side leaf valve Vp is mounted to the outer periphery of the collar 61, similar to the case where the contraction-side ring plate 62 is provided, the contraction-side load acts on the contraction-side leaf valve Vp.

In the case where the pressure of the extension-side back-pressure chamber Ce is equal to the pressure of the contraction-side back-pressure chamber Cp, the extension-side load, which is the load that the extension-side leaf valve Ve receives from the extension-side back-pressure chamber Ce, is configured larger than the contraction-side load, which is the load that the contraction-side leaf valve Vp receives from the contraction-side back-pressure chamber Cp. It should be noted that, in the case where the extension-side back-pressure chamber Ce is closed by the extension-side spool Se and the pressure of the extension-side back-pressure chamber Ce does not directly act on the extension-side ring plate 66, the extension-side load is determined only by the pressure-receiving area of the extension-side spool Se, which receives the pressure of the extension-side back-pressure chamber Ce. Similarly, in the case where the contraction-side back-pressure chamber Cp is closed by contraction-side spool Sp and the pressure of the contraction-side back-pressure chamber Cp does not directly act on the contraction-side ring plate 62, the contraction-side load is determined only by the pressure-receiving area of the contraction-side spool Sp, which receives the pressure of the contraction-side back-pressure chamber Cp. Assume the case where the pressure of the extension-side back-pressure chamber Ce is equal to the pressure of the contraction-side back-pressure chamber Cp. To increase the extension-side load that the extension-side leaf valve Ve receives from the extension-side back-pressure chamber Ce to be larger than the contraction-side load that the contraction-side leaf valve Vp receives from the contraction-side back-pressure chamber Cp, in the case where the pressures of the back-pressure chambers Ce and Cp directly act neither on the extension-side leaf valve Ve nor the contraction-side leaf valve Vp, it is only necessary to increase the pressure-receiving area of the extension-side spool Se to be larger than the pressure-receiving area of the contraction-side spool Sp.

As described above, the extension-side ring plate 66 and the contraction-side ring plate 62 may be done away, the pressure of the extension-side back-pressure chamber Ce may be caused to directly act on the extension-side leaf valve Ve, and the pressure of the contraction-side back-pressure chamber Cp may be caused to directly act on the contraction-side leaf valve Vp. With a structure of closing the extension-side back-pressure chamber Ce by the extension-side spool Se, the extension-side spool Se abuts on the extension-side leaf valve Ve. With a structure of closing the contraction-side back-pressure chamber Cp by the contraction-side spool Sp, the contraction-side spool Sp abuts on the contraction-side leaf valve Vp. Whether the structure where the extension-side back-pressure chamber Ce and the contraction-side back-pressure chamber Cp are closed by the spool is used or not can be optionally selected.

The use of the extension-side spool Se and the contraction-side spool Sp allows configuring the pressure-receiving area on which the pressure of the extension-side back-pressure chamber Ce substantially acts can be configured larger than the pressure-receiving area of the extension-side leaf valve Ve alone. Thus, the pressure-receiving area difference between the contraction-side spool Sp and the extension-side spool Se can be set large. This allows providing the large difference between the extension-side load and the contraction-side load, thereby ensuring enlarging a range in which the extension-side load and the contraction-side load are configured.

While the damper D is in the extension operation, the extension-side leaf valve Ve receives the pressure from the extension-side chamber R1 through the extension-side passage 3 and receives the extension-side load from the back surface side. When the extension-side load exceeds the pressing-down force by the pressure of the extension-side chamber R1, the extension-side leaf valve Ve warps to abut on the extension-side valve seat 2d, thus obstructing the extension-side passage 3. At a certain piston speed while the damper D is in the extension operation, the extension-side load when the extension-side leaf valve Ve obstructs the extension-side passage 3 can be configured by the pressure-receiving area on which the pressure of the extension-side back-pressure chamber Ce acts, the warp rigidity of the extension-side leaf valve Ve and the extension-side ring plate 66, or a similar condition. Regarding the contraction-side leaf valve Vp, similar to the extension-side leaf valve Ve, at a certain piston speed while the damper D is in the contraction operation, the contraction-side load when the contraction-side leaf valve Vp obstructs the contraction-side passage 4 can be configured by the pressure-receiving area on which the pressure of the contraction-side back-pressure chamber Cp acts, the warp rigidity of the contraction-side leaf valve Vp and the contraction-side ring plate 62, or a similar condition.

With the extension-side back-pressure chamber Ce and the contraction-side back-pressure chamber Cp at the upstream and the extension-side discharge passage Ee and the contraction-side discharge passage Ep at the downstream, the electromagnetic pressure control valve 6 is provided in the adjustment passage Pc, which allows communication between the extension-side back-pressure chamber Ce, the contraction-side back-pressure chamber Cp, the extension-side discharge passage Ee, and the contraction-side discharge passage Ep. The electromagnetic pressure control valve 6 can control the pressures of the upstream extension-side back-pressure chamber Ce and contraction-side back-pressure chamber Cp. To control the pressures of the extension-side back-pressure chamber Ce and the contraction-side back-pressure chamber Cp by the electromagnetic pressure control valve 6, even if the pressure in the extension-side back-pressure chamber Ce and the pressure in the contraction-side back-pressure chamber Cp are identical, the extension-side load becomes larger than the contraction-side load. In view of this, even if the large extension-side load is required, the pressure in the extension-side back-pressure chamber Ce needs not to be increased so much. Accordingly, even if the extension-side damping force is desired to be increased, a maximum pressure to be controlled by the electromagnetic pressure control valve 6 can be kept low.

It should be noted that, in the case where the inner peripheral of the extension-side spool Se is not slidably in contact with the outer periphery of the mounting portion 12*a* of the extension-side chamber 12, the pressure of the extension-side back-pressure chamber Ce acts on the back surface side of the extension-side leaf valve Ve and the inside with respect to a site where the ring projection 14 abuts on, thus biasing the extension-side leaf valve Ve. In view of this, the extension-side load is configured also considering the biasing load caused by the pressure of the extension-side back-pressure chamber Ce directly acting on the extension-side leaf valve Ve. Similarly, in the case where the inner peripheral of the contraction-side spool Sp is not slidably in contact with the outer periphery of the mounting portion 11*a* of the contraction-side chamber 11, the pressure of the contraction-side back-pressure chamber Cp acts on the back surface side of the contraction-side leaf valve Vp and the inside with respect to a site where the ring projection 18 abuts on, thus biasing the contraction-side leaf valve Vp. In view of this, the contraction-side load is configured also considering the biasing load caused by the pressure of the contraction-side back-pressure chamber Cp directly acting on the contraction-side leaf valve Vp.

The electromagnetic pressure control valve 6 is configured to close the adjustment passage Pc during non-energization and perform the pressure control during the energization. The adjustment passage Pc includes a fail valve FV that bypasses the electromagnetic pressure control valve 6 and can allow communication between the upstream and the downstream.

Figure 2:
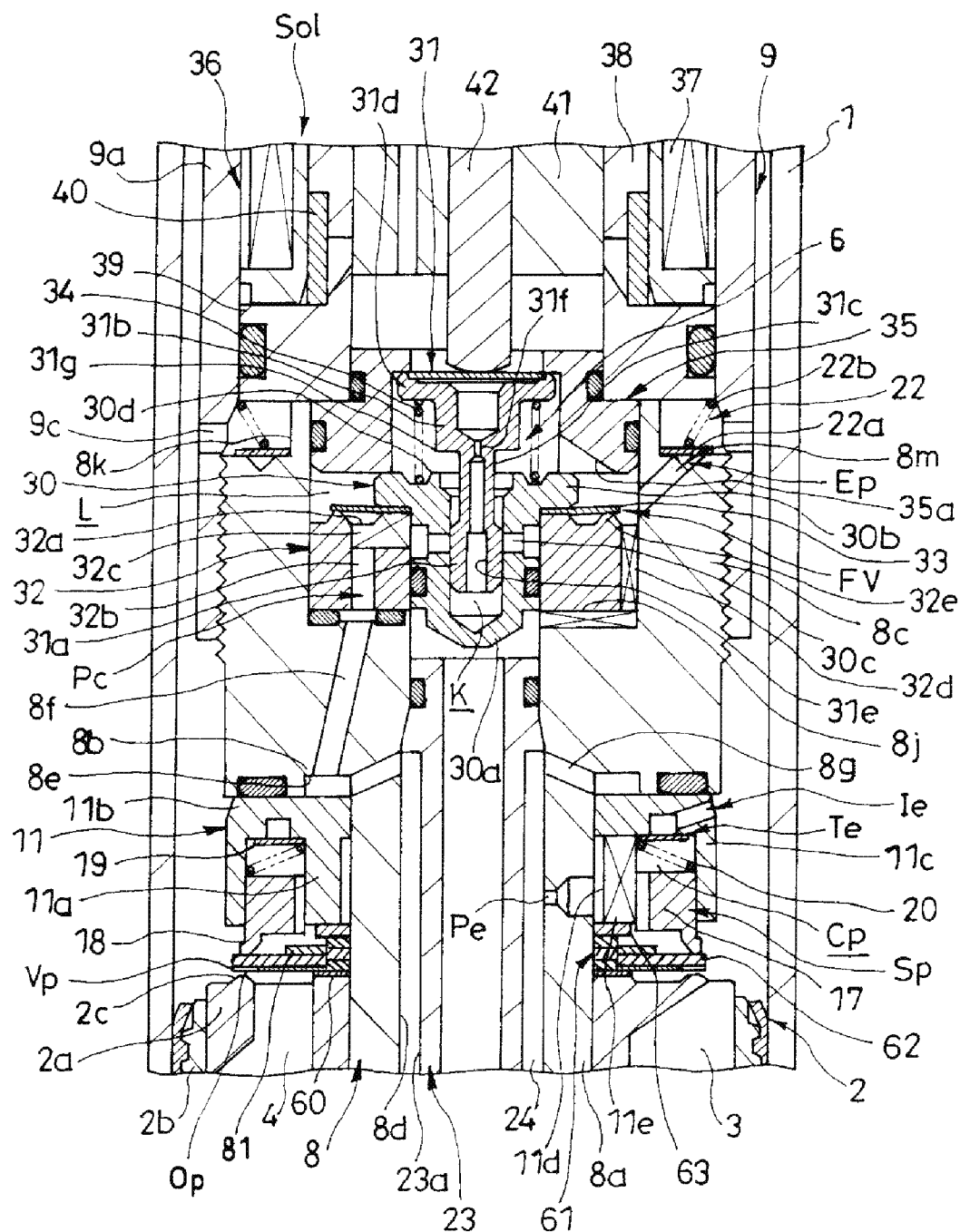
FIG. 2 is an enlarged cross-sectional view of a part of the damper that applies the damping valve according to the embodiment of the present invention.

As illustrated in FIG. 1 and FIG. 2, the electromagnetic pressure control valve 6 includes a valve seat member 30, which includes a valve housing tube 30*a* and a control valve valve seat 30*d*, an electromagnetic valve valve element 31 that separates from and is seated on the control valve valve seat 30*d*, and a solenoid Sol. The solenoid Sol provides a thrust to the electromagnetic valve valve element 31 to axially drive the electromagnetic valve valve element 31.

An insertion of the valve housing tube 30*a* into an inner peripheral of a ring-shaped valve housing 32 radially positions the valve seat member 30, and the housing portion L internally houses the valve seat member 30. The valve housing 32 is stacked on the upper side of the flange 8*b* in FIG. 2 and fitted to the inside of the socket 8*c* of the piston holding member 8.

As illustrated in FIG. 2, the valve housing 32 is a ring-shaped member. The valve housing 32 includes a ring window 32*a*, which is formed on the upper end in FIG. 2, a port 32*b*, a cutout groove 32*c*, a groove 32*d*, and a ring-shaped fail valve valve seat 32*e*. The port 32*b* opens to the ring window 32*a* and runs to the lower end in FIG. 2. The cutout groove 32*c* opens to an inner peripheral on the upper end in FIG. 2 and runs to the port 32*b*. The groove 32*d* is formed on the outer peripheral surface along the axis direction. The fail valve valve seat 32*e* surrounds the outer periphery of the ring window 32*a*.

When the valve housing 32 is inserted into the socket 8*c* and is stacked on the upper end of the flange 8*b* in FIG. 2, the port 32*b* is opposed to the opening end of the port 8*f* and the port 32*b* and the cutout groove 32*c* communicate with the port 8*f*. Furthermore, the groove 32*d* is opposed to the groove 8*j* provided at the flange 8*b*, and the groove 32*d* communicates with the groove 8*j*.

Thus, the port 32*b* and the cutout groove 32*c* communicate with the communication passage 24 through the port 8*f*, the ring groove 8*e*, and the horizontal hole 8*g*. Further, the port 32*b* and the cutout groove 32*c* communicate with the extension-side back-pressure chamber Ce and the contraction-side back-pressure chamber Cp through the communication passage 24, the extension-side pilot orifice Pe, and the contraction-side pilot orifice Pp. The groove 32*d* communicates with the inside of the separator 23 through the groove 8*j* and communicates with the contraction-side chamber R2 through the extension-side discharge passage Ee where the check valve 25 is provided. The groove 32*d* communicates with the extension-side chamber R1 through the contraction-side discharge passage Ep, which is constituted of the through hole 9*c*, the concave portion 8*k*, the through-hole 8*m*, and the check valve 22.

The valve housing 32 internally houses the tubular valve housing tube 30*a* of the valve seat member 30. The valve seat member 30 includes the tubular valve housing tube 30*a* with a closed bottom, a through hole 30*c*, and a ring-shaped control valve valve seat 30*d*. A flange 30*b* is provided at an outer periphery on the upper end of the valve housing tube 30*a* in FIG. 2. The through hole 30*c* opens to a side portion of the valve housing tube 30*a* and runs to the inside. The control valve valve seat 30*d* is provided on the upper end of the valve housing tube 30*a* in FIG. 2 and axially projects.

A fail valve valve element 33, which is a ring-shaped leaf valve, is provided on an outer periphery of the valve housing tube 30*a* of the valve seat member 30. When the valve seat member 30 is attached to the valve housing 32, an inner peripheral of the fail valve valve element 33 is sandwiched between the flange 30*b* of the valve seat member 30 and the inner peripheral on the upper end of the valve housing 32 in FIG. 2 and is secured. An outer peripheral side of the fail valve valve element 33 to which an initial warp is provided is seated on the ring-shaped the fail valve valve seat 32*e* provided at the valve housing. In view of this, the fail valve valve element 33 obstructs the ring window 32*a*. When the pressure acting on the inside of the ring window 32*a* reaches the valve opening pressure through the port 32*b*, the fail valve valve element 33 warps and opens the ring window 32*a* to allow the port 32*b* communicate with the extension-side discharge passage Ee and the contraction-side discharge passage Ep. The fail valve FV is constituted of the fail valve valve element 33 and the fail valve valve seat 32*e*.

The attachment of the valve seat member 30 to the valve housing 32 causes the cutout groove 32*c*, which is formed at the valve housing 32, to be opposed to the through hole 30*c*, which is formed at the valve housing tube 30*a*. In view of this, the extension-side back-pressure chamber Ce and the contraction-side back-pressure chamber Cp communicate with the inside of the valve housing tube 30*a* through the port 32*b*.

A ring-shaped valve fixing member 35 is disposed on the upper side of the valve seat member 30 in FIG. 1. The valve fixing member 35 abuts on the upper end of the flange 30*b* in FIG. 1. Furthermore, the solenoid Sol is disposed on the upper side of the valve fixing member 35 in FIG. 1. The electromagnetic valve housing tube 9 internally houses the solenoid Sol. When the piston holding member 8 is screwed with the electromagnetic valve housing tube 9, the valve housing 32, the fail valve valve element 33, the valve seat member 30, the valve fixing member 35, and the solenoid Sol are sandwiched between the electromagnetic valve housing tube 9 and the piston holding member 8 and are secured.

The valve fixing member 35 includes a cutout groove 35a. Even if the flange 30b of the valve seat member 30 abuts on the valve fixing member 35, the cutout groove 35a allows communication between a space on the inner peripheral side of the valve fixing member 35 and a space on the outer peripheral side of the valve seat member 30. A passage that allows communication between the space on the inner peripheral side of the valve fixing member 35 and the space on the outer peripheral side of the valve seat member 30 is not limited to the cutout groove 35a but may be a through-hole such as a port.

The solenoid Sol includes a mold stator 36 with topped tubular shape, a first stator iron core 38, a ring-shaped second stator iron core 39, a feeler ring 40, a tubular movable iron core 41, and a shaft 42. The mold stator 36 integrates a winding wire 37 and the harness H energized to the winding wire 37 with a mold resin. The first stator iron core 38 has a topped tubular shape and is fitted to an inner peripheral of the mold stator 36. The second stator iron core 39 is disposed abutting on a lower end of the mold stator 36 in FIG. 1. The feeler ring 40 is interposed between the first stator iron core 38 and the second stator iron core 39 to form a magnetic gap. The movable iron core 41 is disposed to be axially movable on the inner peripheral sides of the first stator iron core 38 and the second stator iron core 39. The shaft 42 is secured to the inner peripheral of the movable iron core 41. The energization of the winding wire 37 suctions the movable iron core 41 and a downward thrust in FIG. 1 is provided to the shaft 42.

Furthermore, the electromagnetic valve valve element 31 is slidably inserted into the valve seat member 30. The electromagnetic valve valve element 31 includes a small-diameter portion 31a, a large-diameter portion 31b, a ring-shaped concave portion 31c, a flange-shaped spring receiving portion 31d, a connecting passage 31e, and an orifice 31f. The small-diameter portion 31a is slidably inserted into the valve housing tube 30a of the valve seat member 30. The large-diameter portion 31b is provided on a side opposite to the valve seat member 30 side, which is the upper side in FIG. 2, of the small-diameter portion 31a, and is not inserted into the valve housing tube 30a. The concave portion 31c is provided between the small-diameter portion 31a and the large-diameter portion 31b. The spring receiving portion 31d is provided at the outer periphery on an end portion of the large-diameter portion 31b on a side opposite to the valve seat member 30 side. The connecting passage 31e penetrates from a distal end to a rear end of the electromagnetic valve valve element 31. The orifice 31f is provided in the middle of the connecting passage 31e.

A seating portion 31g opposed to the control valve valve seat 30d is provided on a lower end of the large-diameter portion 31b of the electromagnetic valve valve element 31 in FIG. 2. The axial movement of the electromagnetic valve valve element 31 with respect to the valve seat member 30 causes the seating portion 31g to separate from and is seated on the control valve valve seat 30d. That is, when the seating portion 31g of the electromagnetic valve valve element 31 is seated on the control valve valve seat 30d of the valve seat member 30, the electromagnetic pressure control valve 6 closes.

Furthermore, a coiled spring 34 to bias the electromagnetic valve valve element 31 in a direction of separating from the valve seat member 30 is interposed between the flange 30b of the valve seat member 30 and the spring receiving portion 31d. The solenoid Sol provides a thrust against the biasing force from the coiled spring 34. Accordingly, the electromagnetic valve valve element 31 is biased always in the direction of separating from the valve seat member 30 by the coiled spring 34. Without the thrust from the solenoid Sol against the coiled spring 34, the electromagnetic valve valve element 31 is held at a position separated most from the valve seat member 30. Means to bias the electromagnetic valve valve element 31 in the direction of separating from the valve seat member 30 is not limited to the coiled spring 34 but may be an elastic body that can provide a sufficient biasing force.

When the electromagnetic valve valve element 31 separates from the valve seat member 30 most, since the small-diameter portion 31a is opposed to the through hole 30c, the through hole 30c is obstructed. When the solenoid Sol is energized to move the electromagnetic valve valve element 31 from the position of separating from the valve seat member 30 most to the valve seat member 30 side by a predetermined amount, since the concave portion 31c is always opposed to the through hole 30c, the through hole 30c is opened.

With the electromagnetic valve valve element 31 opening the through hole 30c and the seating portion 31g separated from the control valve valve seat 30d, the through hole 30c communicates with the extension-side discharge passage Ee and the contraction-side discharge passage Ep through the concave portion 31c of the electromagnetic valve valve element 31 and the cutout groove 35a provided at the valve fixing member 35. The adjustment of the thrust from the solenoid Sol ensures controlling the force of biasing the electromagnetic valve valve element 31 to the valve seat member 30 side. That is, when a resultant force of the thrust by the upstream pressure of the electromagnetic pressure control valve 6 and the force of pressing up the electromagnetic valve valve element 31 by the coiled spring 34 in FIG. 2 exceeds the force of pressing down the electromagnetic valve valve element 31 by the solenoid Sol in FIG. 2, the electromagnetic pressure control valve 6 enters a valve-opening state where the seating portion 31g separates from the control valve valve seat 30d. Thus, adjusting the thrust of the solenoid Sol ensures controlling the upstream pressure of the electromagnetic pressure control valve 6. Since the upstream of the electromagnetic pressure control valve 6 communicates with the extension-side back-pressure chamber Ce and the contraction-side back-pressure chamber Cp via the adjustment passage Pc, the pressures at the extension-side back-pressure chamber Ce and the contraction-side back-pressure chamber Cp can be controlled by the electromagnetic pressure control valve 6. Downstream of the electromagnetic pressure control valve 6 communicates with the extension-side discharge passage Ee and the contraction-side discharge passage Ep. Accordingly, while the damper D is in the extension operation, the liquid passing through the electromagnetic pressure control valve 6 is discharged to the contraction-side chamber R2 on a low-pressure side, and while the damper D is in the contraction operation, the liquid is discharged to the extension-side chamber R1 on the low-pressure side. The adjustment passage Pc is formed of the ring groove 8e, the port 8f, the horizontal hole 8g, the port 32b, the cutout groove 32c, a part of the housing portion L, and the groove 32d.

The electromagnetic pressure control valve 6 has a shutoff position. In a fail where the solenoid Sol cannot be energized, the shutoff position obstructs the through hole 30c of the valve seat member 30 by the small-diameter portion 31a of the electromagnetic valve valve element 31. Thus, the electromagnetic pressure control valve 6 functions as an open/close valve as well as the pressure control valve.

The fail valve FV is configured to open and close the ring window 32*a* running to the port 32*b*. The valve opening pressure of the fail valve FV is configured to be a pressure exceeding an upper limit pressure that can be controlled by the electromagnetic pressure control valve 6. In view of this, when the upstream side pressure of the electromagnetic pressure control valve 6 exceeds the upper limit pressure, the fail valve FV opens and the port 32*b* bypasses the electromagnetic pressure control valve 6 and communicates with the extension-side discharge passage Ee and the contraction-side discharge passage Ep. Consequently, the valve opening pressure of the fail valve FV controls the pressures at the extension-side back-pressure chamber Ce and the contraction-side back-pressure chamber Cp. Accordingly, in the fail where the electromagnetic pressure control valve 6 is in the shutoff position, the fail valve FV controls the pressures of the extension-side back-pressure chamber Ce and the contraction-side back-pressure chamber Cp.

The insertion of the electromagnetic valve valve element 31 into the valve housing tube 30*a* forms a space K on a distal end side with respect to the through hole 30*c* in the valve housing tube 30*a*. This space K communicates with the outside of the electromagnetic valve valve element 31 through the connecting passage 31*e* and the orifice 31*f* provided at the electromagnetic valve valve element 31. In view of this, when the electromagnetic valve valve element 31 moves axially, which is the vertical direction in FIG. 2, with respect to the valve seat member 30, the space K functions as a dashpot, and can reduce a sudden displacement of the electromagnetic valve valve element 31 and reduce a vibrational movement of the electromagnetic valve valve element 31.

The following describes operations of the damper D.

First, the following describes the case of the soft damping force characteristics of the damping force by the damper D, that is, the biasing force to bias the extension-side leaf valve Ve and the contraction-side leaf valve Vp by the biasing mechanism is reduced to lower a damping coefficient. For the soft damping force characteristics, the solenoid Sol is energized such that the resistance imparted to the liquid passing through the adjustment passage Pc by the electromagnetic pressure control valve 6 is reduced. This reduces the biasing force that the biasing mechanism provides such that the extension-side leaf valve Ve and the contraction-side leaf valve Vp are not seated on the corresponding extension-side valve seat 2*d* and contraction-side valve seat 2*c*, respectively.

In this state, even if the biasing force by the biasing mechanism warps the extension-side leaf valve Ve, the extension-side leaf valve Ve is not seated on the extension-side valve seat 2*d*, and a clearance is formed between both. Similarly, even if the biasing force by the biasing mechanism warps the contraction-side leaf valve Vp, the contraction-side leaf valve Vp is not seated on the contraction-side valve seat 2*c*, and a clearance is formed between both.

In this state, when the damper D extends and the piston 2 moves upward in FIG. 1, the liquid presses the extension-side leaf valve Ve to warp the extension-side leaf valve Ve and passes through the extension-side passage 3 and moves from the compressed extension-side chamber R1 to the enlarged contraction-side chamber R2. Since the clearance is formed between the extension-side leaf valve Ve and the extension-side valve seat 2*d*, compared with the state where the extension-side leaf valve Ve is seated on the extension-side valve seat 2*d* and the extension-side passage 3 communicates with the contraction-side chamber R2 only with a cutout 71*a*, the flow passage area is maintained to be large.

The extension-side leaf valve Ve can slide on the outer periphery of the collar 65. In view of this, the extension of the damper D increases the pressure in the extension-side chamber R1. This causes the extension-side leaf valve Ve to retreat from the piston 2 together with the extension-side ring plate 66 and the auxiliary valve 71. This increases the clearance between the extension-side leaf valve Ve and the extension-side valve seat 2*d*. The size of the clearance between the extension-side leaf valve Ve and the extension-side valve seat 2*d* is determined by a balance between the force that the pressure of the extension-side chamber R1 received from the extension-side passage 3 side attempts to retreat the extension-side leaf valve Ve from the piston 2 and the extension-side load by the biasing mechanism.

Figure 4:
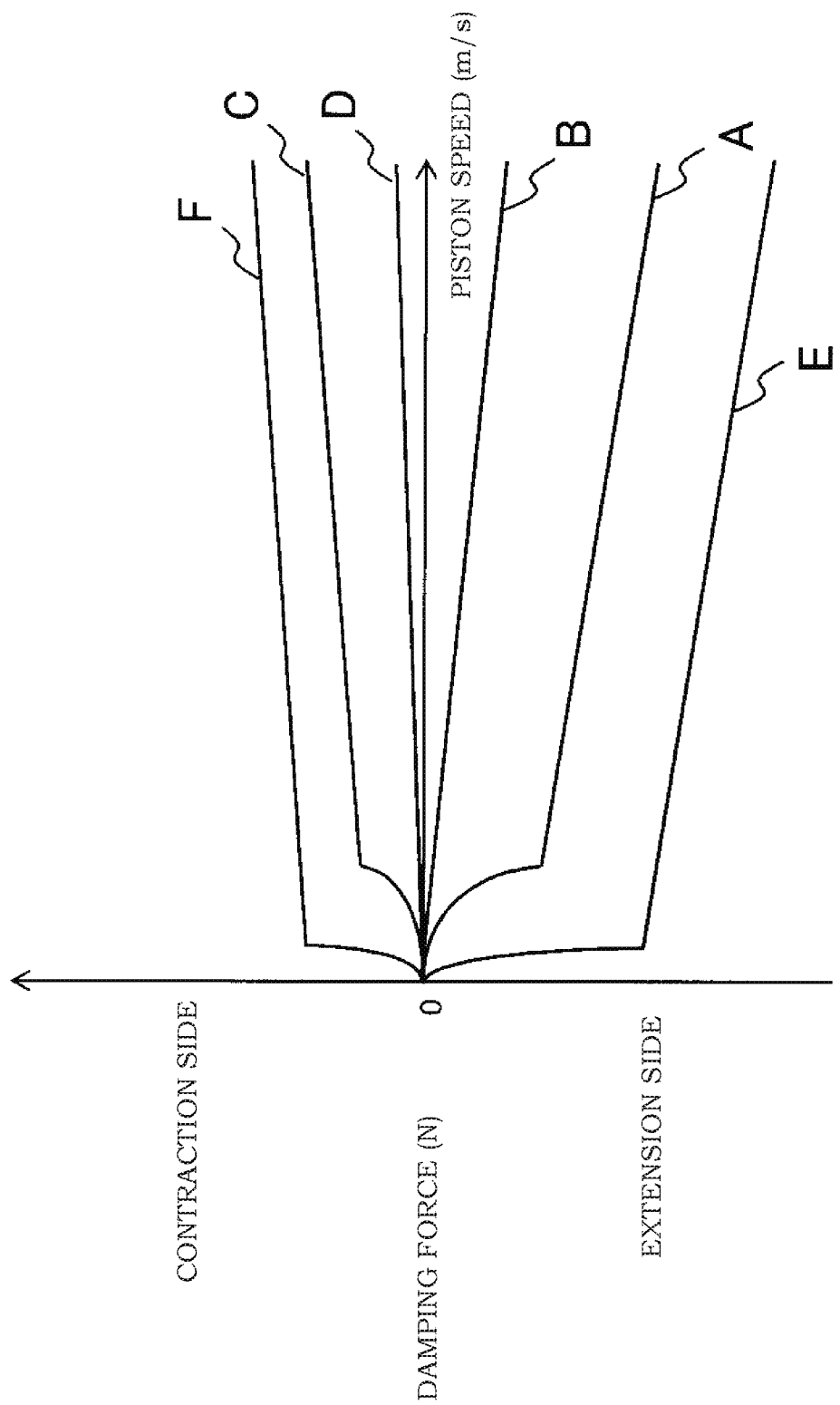
FIG. 4 is a drawing describing damping force characteristics of the damper that applies the damping valve according to the embodiment of the present invention.

Here, to reduce the damping force with the soft damping force characteristics, the rigidity of the extension-side leaf valve Ve needs to be reduced as much as possible. However, the extension-side leaf valve Ve needs to have the rigidity to the extent of enduring the large extension-side load by the biasing mechanism; therefore, reducing the rigidity has a limit. In contrast to this, this damper D has the clearance between the extension-side leaf valve Ve and the extension-side valve seat 2*d*. Furthermore, the entire extension-side leaf valve Ve can retreat from the piston 2. In view of this, while securing the rigidity required for the extension-side leaf valve Ve, the damper D can secure the large flow passage area between the extension-side leaf valve Ve and the extension-side valve seat 2*d*. Thus, this can solve the problem of durability of the extension-side leaf valve Ve. As illustrated in FIG. 4, the damper D can achieve an extremely small gradient of the damping coefficient with the soft damping force characteristics, which is shown by a line B, compared with a damping force generated by the conventional damper, which is shown by a line A, thereby ensuring substantially reducing the damping force.

When an extension speed of the damper D further increases and the pressure in the extension-side chamber R1 increases, the amount of retreat of the extension-side leaf valve Ve from the piston 2 also further increases. When the auxiliary valve 71 abuts on the extension-side stopper 67, additional retreat of the extension-side leaf valve Ve is restricted. Here, when the extension-side leaf valve Ve abuts on the extension-side stopper 67, an axial movement of a part on an inner peripheral side of the extension-side leaf valve Ve is restricted. In view of this, with an outer peripheral end of the extension-side stopper 67 as a fulcrum, outer peripheral sides of the extension-side leaf valve Ve, the extension-side ring plate 66, and the auxiliary valve 71 warp, further opening the extension-side passage 3. An amount of warp at this time is determined by a balance between a force that the pressure of the extension-side chamber R1 received from the extension-side passage 3 side attempts to warp the extension-side leaf valve Ve, the extension-side ring plate 66, and the auxiliary valve 71, a force that the extension-side leaf valve Ve, the extension-side ring plate 66, and the auxiliary valve 71 attempt to return to the extension-side valve seat 2*d* side by a spring restoring force generated by themselves according to the amount of warp, and the extension-side load by the biasing mechanism.

The liquid in the extension-side chamber R1 presses and opens the extension-side check valve Te, passes through the extension-side pressure introduction passage Ie, and flows to the adjustment passage Pc. The liquid passing through the adjustment passage Pc presses and opens the check valve 25 and is discharged to the contraction-side chamber R2 on the low-pressure side through the extension-side discharge passage Ee. It should be noted that, the extension-side pilot orifice Pe imparts the resistance to the passing liquid to produce a pressure loss. While the liquid flows, the pressure at the downstream of the adjustment passage Pc becomes lower than that of the extension-side chamber R1. In view of this, the check valve 22 provided at the contraction-side discharge passage Ep does not open but is held to be obstructed.

The extension-side pressure introduction passage Ie not only communicates with the contraction-side back-pressure chamber Cp but also communicates with the extension-side back-pressure chamber Ce through the communication passage 24. In view of this, while the damper D is in the extension operation, the pressure in the extension-side back-pressure chamber Ce becomes higher than that of the contraction-side chamber R2 and the contraction-side pressure introduction passage Ip is obstructed by the contraction-side check valve Tp. It should be noted that, the pressure at the contraction-side back-pressure chamber Cp becomes higher than that of the contraction-side chamber R2 on the low-pressure side. However, the pressure only biases the contraction-side leaf valve Vp that obstructs the contraction-side passage 4 where the liquid does not flow; therefore, this does not cause an inconvenience.

Here, the pressure in the extension-side back-pressure chamber Ce is controlled by the energization of the solenoid Sol of the electromagnetic pressure control valve 6 provided at the adjustment passage Pc to adjust the upstream side pressure of the adjustment passage Pc. That is, adjusting the amount of energization to the solenoid Sol ensures controlling the extension-side load to be a desired magnitude. This allows controlling a degree of opening of the extension-side leaf valve Ve by the electromagnetic pressure control valve 6, ensuring controlling the extension-side damping force while the damper D is in the extension operation.

Meanwhile, when the damper D contracts and the piston 2 moves downward in FIG. 1, the liquid presses the contraction-side leaf valve Vp to warp the contraction-side leaf valve Vp and passes through the contraction-side passage 4 and moves from the compressed contraction-side chamber R2 to the enlarged extension-side chamber R1. Since the clearance is formed between the contraction-side leaf valve Vp and the contraction-side valve seat 2c, compared with the state where the contraction-side leaf valve Vp is seated on the contraction-side valve seat 2c and the contraction-side passage 4 communicates with the extension-side chamber R1 only a the cutout 81a, the flow passage area is maintained to be large.

The contraction-side leaf valve Vp can slide on the outer periphery of the collar 61. In view of this, the contraction of the damper D increases the pressure in the contraction-side chamber R2. This causes the contraction-side leaf valve Vp to retreat from the piston 2 together with the contraction-side ring plate 62 and the auxiliary valve 81. This increases the clearance between the contraction-side leaf valve Vp and the contraction-side valve seat 2c. The size of the clearance between the contraction-side leaf valve Vp and the contraction-side valve seat 2c is determined by a balance between the force that the pressure of the contraction-side chamber R2 received from the contraction-side passage 4 side attempts to retreat the contraction-side leaf valve Vp from the piston 2 and the contraction-side load by the biasing mechanism.

Here, to reduce the damping force in the case of the soft damping force characteristics, the rigidity of the contraction-side leaf valve Vp needs to be reduced as much as possible. However, similar to the extension-side leaf valve Ve, the contraction-side leaf valve Vp needs to have the rigidity to the extent of enduring the large contraction-side load by the biasing mechanism; therefore, reducing the rigidity has a limit. In contrast to this, this damper D has the clearance between the contraction-side leaf valve Vp and the contraction-side valve seat 2c. Furthermore, the entire contraction-side leaf valve Vp can retreat from the piston 2. In view of this, while securing the rigidity required for the contraction-side leaf valve Vp, the damper D can secure the large flow passage area between the contraction-side leaf valve Vp and the contraction-side valve seat 2c. Thus, this can solve the problem of durability of the contraction-side leaf valve Vp. As illustrated in FIG. 4, the damper D can achieve an extremely small gradient of the damping coefficient with the soft damping force characteristics, which is shown by a line D, compared with a damping force generated by the conventional damper, which is shown by a line C, thereby ensuring substantially reducing the damping force.

When a contraction speed of the damper D further increases and the pressure in the contraction-side chamber R2 increases, the amount of retreat of the contraction-side leaf valve Vp from the piston 2 also further increases. When the auxiliary valve 81 abuts on the contraction-side stopper 63, additional retreat of the contraction-side leaf valve Vp is restricted. Here, when the contraction-side leaf valve Vp abuts on the contraction-side stopper 63, an axial movement of a part on an inner peripheral side of the contraction-side leaf valve Vp is restricted. In view of this, with an outer peripheral end of the contraction-side stopper 63 as a fulcrum, outer peripheral sides of the contraction-side leaf valve Vp, the contraction-side ring plate 62, and the auxiliary valve 81 warp, further opening the contraction-side passage 4. The amount of warp at this time is determined by a balance between a force that the pressure of the contraction-side chamber R2 received from the contraction-side passage 4 side attempts to warp the contraction-side leaf valve Vp, the contraction-side ring plate 62, and the auxiliary valve 81, a force that the contraction-side leaf valve Vp, the contraction-side ring plate 62, and the auxiliary valve 81 attempt to return to the contraction-side valve seat 2c side by a spring restoring force generated by themselves according to the amount of warp, and the contraction-side load by the biasing mechanism.

The liquid in the contraction-side chamber R2 presses and opens the contraction-side check valve Tp, passes through the contraction-side pressure introduction passage Ip, and flows to the adjustment passage Pc. The liquid passing through the adjustment passage Pc presses and opens the check valve 22 and is discharged to the extension-side chamber R1 on the low-pressure side through the contraction-side discharge passage Ep. It should be noted that, the contraction-side pilot orifice Pp imparts the resistance to the passing liquid to produce a pressure loss. While the liquid flows, the pressure at the downstream of the adjustment passage Pc becomes lower than that of the contraction-side chamber R2. In view of this, the check valve 25 provided at the extension-side discharge passage Ee does not open but is held to be obstructed.

The contraction-side pressure introduction passage Ip not only communicates with the extension-side back-pressure chamber Ce but also communicates with the contraction-side back-pressure chamber Cp e through the communication passage 24. In view of this, while the damper D is in the contraction operation, the pressure in the contraction-side back-pressure chamber Cp becomes higher than that of the extension-side chamber R1 and the extension-side pressure introduction passage Ie is obstructed by the extension-side check valve Te. It should be noted that, the pressure at the extension-side back-pressure chamber Ce becomes higher than that of the extension-side chamber R1 on the low-pressure side. However, the pressure only biases the extension-side leaf valve Ve that obstructs the extension-side passage 3 where the liquid does not flow; therefore, this does not cause an inconvenience.

Here, the pressure in the contraction-side back-pressure chamber Cp is controlled by the energization of the solenoid Sol of the electromagnetic pressure control valve 6 provided at the adjustment passage Pc to adjust the upstream side pressure of the adjustment passage Pc. That is, adjusting the amount of energization to the solenoid Sol ensures controlling the contraction-side load to be a desired magnitude. This allows controlling a degree of opening of the contraction-side leaf valve Vp by the electromagnetic pressure control valve 6, ensuring controlling the contraction-side damping force while the damper D is in the contraction operation.

Next, the following describes the case of the hard damping force characteristics of the damping force by the damper D, that is, the biasing force to bias the extension-side leaf valve Ve and the contraction-side leaf valve Vp by the biasing mechanism is increased to raise the damping coefficient. For the hard damping force characteristics, the solenoid Sol is energized such that the resistance imparted to the liquid passing through the adjustment passage Pc by the electromagnetic pressure control valve 6 is increased. This increases the biasing force provided by the biasing mechanism such that the extension-side leaf valve Ve and the contraction-side leaf valve Vp are seated on the corresponding extension-side valve seat 2d and contraction-side valve seat 2c, respectively.

In this state, the biasing mechanism warps the extension-side leaf valve Ve, the extension-side leaf valve Ve is seated on the extension-side valve seat 2d, and a clearance is not formed between both. Similarly, the biasing mechanism warps the contraction-side leaf valve Vp, the contraction-side leaf valve Vp is seated on the contraction-side valve seat 2c, and a clearance is not formed between both.

When the damper D extends, the piston 2 moves upward in FIG. 1, and the piston speed is low, even if the extension-side leaf valve Ve receives the pressure of the extension-side chamber R1 from the extension-side passage 3, the extension-side leaf valve Ve does not separate from the extension-side valve seat 2d. Excluding the adjustment passage Pc, the extension-side chamber R1 communicates with the contraction-side chamber R2 through only the cutout Oe provided at the extension-side leaf valve Ve. Consequently, the damper D imparts the resistance by the cutout Oe, which functions as the orifice, to the flow of the liquid passing through the extension-side passage 3. Compared with the case where the damping force is generated with the clearance formed between the extension-side leaf valve Ve and the extension-side valve seat 2d, the damper D can provide the large damping force.

Meanwhile, an increase in piston speed increases the pressure of the extension-side chamber R1 acting on the extension-side leaf valve Ve through the extension-side passage 3. In the case where the force in the direction that the extension-side leaf valve Ve is separated from the extension-side valve seat 2d by the pressure of the extension-side chamber R1 exceeds the biasing force from the biasing mechanism, the entire extension-side leaf valve Ve retreats from the piston 2, presses down the extension-side ring plate 66, the auxiliary valve 71, and the extension-side spool Se downward in FIG. 3, and separates from the extension-side valve seat 2d. However, the biasing force by the biasing mechanism is larger than the case of the soft damping force characteristics; therefore, the amount that the extension-side leaf valve Ve retreats from the piston 2 is small.

When the piston speed further increases and the auxiliary valve 71 abuts on the extension-side stopper 67, the outer peripheral side of the extension-side leaf valve Ve warps together with the extension-side ring plate 66 and the auxiliary valve 71 and presses down the extension-side spool Se downward in FIG. 3, thus enlarging the flow passage area between the extension-side leaf valve Ve and the extension-side valve seat 2d. However, the biasing force by the biasing mechanism is larger than the case of the soft damping force characteristics; therefore, the flow passage area between the extension-side leaf valve Ve and the extension-side valve seat 2d is smaller than the case of the soft damping force characteristics. Accordingly, as shown by a line E in FIG. 4, even when the piston speed is identical, the damper D can provide the higher damping force during the hard compared with during the soft.

Similar to the case of the soft damping force characteristics, the liquid in the extension-side chamber R1 presses and opens the extension-side check valve Te, passes through the extension-side pressure introduction passage Ie, and flows to the adjustment passage Pc. Similar to the case of during the soft, controlling the upstream side pressure of the adjustment passage Pc by the electromagnetic pressure control valve 6, which is provided at the adjustment passage Pc, can adjust the pressure in the extension-side back-pressure chamber Ce and control the extension-side load to be a desired magnitude. Thus, controlling the degree of opening of the extension-side leaf valve Ve by the electromagnetic pressure control valve 6 allows controlling the extension-side damping force while the damper D is in the extension operation also during the hard.

Next, when the damper D contracts, the piston 2 moves downward in FIG. 1, and the piston speed is low, even if the contraction-side leaf valve Vp receives the pressure of the contraction-side chamber R2 from the contraction-side passage 4, the contraction-side leaf valve Vp does not separate from the contraction-side valve seat 2c. Excluding the adjustment passage Pc, the contraction-side chamber R2 communicates with the extension-side chamber R1 through only the cutout Op provided at the contraction-side leaf valve Vp. Consequently, the damper D imparts the resistance by the cutout Op, which functions as the orifice, to the flow of the liquid passing through the contraction-side passage 4. Compared with the case where the damping force is generated with the clearance formed between the contraction-side leaf valve Vp and the contraction-side valve seat 2c, the damper D can provide the large damping force.

Meanwhile, the increase in piston speed increases the pressure of the contraction-side chamber R2 acting on the contraction-side leaf valve Vp through the contraction-side passage 4. In the case where the force in the direction that the contraction-side leaf valve Vp is separated from the contraction-side valve seat 2c by the pressure of the contraction-side chamber R2 exceeds the biasing force from the biasing mechanism, the entire contraction-side leaf valve Vp retreats from the piston 2, presses up the contraction-side ring plate 62, the auxiliary valve 81, and the contraction-side spool Sp upward in FIG. 3, and separates from the contraction-side valve seat 2c. However, the biasing force by the biasing mechanism is larger than the case of the soft damping force characteristics; therefore, the amount that the contraction-side leaf valve Vp retreats from the piston 2 is small.

When the piston speed further increases and the auxiliary valve 81 abuts on the contraction-side stopper 63, the outer peripheral side of the contraction-side leaf valve Vp warps together with the contraction-side ring plate 62 and the auxiliary valve 81 and presses up the contraction-side spool Sp upward in FIG. 3, thus enlarging the flow passage area between contraction-side leaf valve Vp and the contraction-side valve seat 2c. However, the biasing force by the biasing mechanism is larger than the case of the soft damping force characteristics; therefore, the flow passage area between the contraction-side leaf valve Ve and the contraction-side valve seat 2c is smaller than the case of the soft damping force characteristics. Accordingly, as shown by a line F in FIG. 4, even when the piston speed is identical, the damper D can provide the higher damping force during the hard compared with during the soft.

Similar to the case of the soft damping force characteristics, the liquid in the contraction-side chamber R2 presses and opens the contraction-side check valve Tp, passes through the contraction-side pressure introduction passage Ip, and flows to the adjustment passage Pc. Similar to the case of during the soft, controlling the upstream side pressure of the adjustment passage Pc by the electromagnetic pressure control valve 6, which is provided at the adjustment passage Pc, can adjust the pressure in the contraction-side back-pressure chamber Cp and control the contraction-side load to be a desired magnitude. Thus, controlling the degree of opening of the contraction-side leaf valve Vp by the electromagnetic pressure control valve 6 allows controlling the contraction-side damping force while the damper D is in the contraction operation also during the hard.

Thus, with the damping valve and the damper D of this embodiment, the clearance is formed between the leaf valves Ve and Vp and the respective valve seats 2c and 2d. Additionally, the entire leaf valves Ve and Vp can axially retreat from the piston 2. This allows providing the flow passage area larger compared with the conventional damping valve and damper using the fixed orifice while securing the rigidity of the leaf valves Ve and Vp. Accordingly, the damping valve and the damper D with the above-described configuration can reduce the damping force in the case of the soft damping force characteristics. In the case of the hard damping force characteristics, the damping valve and the damper D can cause the leaf valves Ve and Vp to be seated on the respective valve seats 2c and 2d to increase the damping force. Thus, the damping valve and the damper D can secure a variable width of the damping force.

Accordingly, the damping valve and the damper according to this embodiment can reduce the damping force in the case of the soft damping force characteristics and can enlarge a damping force adjustment width.

To switch the damping force characteristics of the damper D from the soft to the hard, in the extension operation, increasing the pressure in the extension-side back-pressure chamber Ce gradually reduces the clearance between the extension-side leaf valve Ve and the extension-side valve seat 2d to cause the extension-side leaf valve Ve to be seated on the extension-side valve seat 2d. In the contraction operation, increasing the pressure in the contraction-side back-pressure chamber Cp gradually reduces the clearance between the contraction-side leaf valve Vp and the contraction-side valve seat 2c to cause the contraction-side leaf valve Vp to be seated on the contraction-side valve seat 2c.

On the contrary, to switch the damping force characteristics of the damper D from the hard to the soft, in the extension operation, reducing the pressure in the extension-side back-pressure chamber Ce gradually increases the clearance between the extension-side leaf valve Ve and the extension-side valve seat 2d. In the contraction operation, reducing the pressure in the contraction-side back-pressure chamber Cp gradually increases the clearance between the contraction-side leaf valve Vp and the contraction-side valve seat 2c.

Accordingly, when the damping force characteristics of the damper D are switched from the soft to the hard or is switched from the hard to the soft, this reduces a sudden change in the damping force characteristics of the damper D. An application of this damper D to the vehicle reduces the rapid change in damping force characteristics. Accordingly, an occupant does not sense a shock during the switching of the damping force characteristics, ensuring improving a ride comfort in the vehicle.

The extension-side ring plate 66 slidably mounted to the outer periphery of the collar 65 is stacked on the back surface of the extension-side leaf valve Ve. The contraction-side ring plate 62 slidably mounted to the outer periphery of the collar 61 is stacked on the back surface of the contraction-side leaf valve Vp. The extension-side ring plate 66 and the contraction-side ring plate 62 receive the biasing force from the biasing mechanism. Therefore, increasing the rigidity of the extension-side ring plate 66 more than that of the extension-side leaf valve Ve and increasing the rigidity of the contraction-side ring plate 62 more than that of the contraction-side leaf valve Vp prevents the deformation of the extension-side leaf valve Ve and the contraction-side leaf valve Vp by the biasing force from the biasing mechanism. This allows reducing the deterioration of the extension-side leaf valve Ve and the contraction-side leaf valve Vp.

The inner diameter of the extension-side ring plate 66 stacked on the back surface of the extension-side leaf valve Ve is smaller than the outer diameter of the inner peripheral seat 2h of the piston 2. The outer diameter of the extension-side ring plate 66 is larger than the inner diameter of the extension-side valve seat 2d. Similarly, the inner diameter of the contraction-side ring plate 62 stacked on the back surface of the contraction-side leaf valve Vp is smaller than the outer diameter of the inner peripheral seat 2f of the piston 2. The outer diameter of the contraction-side ring plate 62 is larger than the inner diameter of the contraction-side valve seat 2c. In view of this, the extension-side ring plate 66 and the contraction-side ring plate 62 receive the pressures acting on the back surface sides of the extension-side leaf valve Ve and the contraction-side leaf valve Vp. Therefore, disposing the extension-side ring plate 66 and the contraction-side ring plate 62 can prevent an excessive bending force to the piston 2 side from acting on the extension-side leaf valve Ve and the contraction-side leaf valve Vp.

Furthermore, the extension-side stopper 67 and the contraction-side stopper 63, which restrict a distance that the leaf valves Ve and Vp and the ring plates 66 and 62 retreat from the piston 2, are stacked on the collars 61 and 65 as the shaft members. In this case, changing the thickness and the number of the extension-side stoppers 67 and the contraction-side stoppers 63 allows adjusting the axial positions of the extension-side chamber 12 and the contraction-side chamber 11, which constitute the biasing mechanism.

The extension-side ring spacer 64 and the contraction-side ring spacer 60 are provided between the inner peripheral seats 2f and 2h, which are provided at the piston 2 as the valve disc, and the extension-side leaf valve Ve and the contraction-side leaf valve Vp. In this case, changing the thickness and the number of the extension-side ring spacers 64 and the contraction-side ring spacers 60 allows adjusting the size of the clearance formed between the extension-side leaf valve Ve and the piston 2 and the clearance formed between the contraction-side leaf valve Vp and the piston 2. This ensures tuning the damping force characteristics of the damper D during the soft.

The biasing mechanism biases the leaf valves Ve and Vp using one or both pressures of the extension-side chamber R1 and the contraction-side chamber R2 in the damper D. This ensures biasing the leaf valves Ve and Vp without an additional preparation of a source to generate the biasing force. Adjusting the pressure can change the biasing force.

In the damper for vehicle, the extension-side damping force in the extension operation needs to be larger than the contraction-side damping force in the contraction operation. For example, in the single-rod type damper D, the pressure-receiving area that receives the pressure of the extension-side chamber R1 is the area found by subtracting a cross-sectional area of the rod member 10 from a cross-sectional area of the piston 2. Accordingly, the pressure of the extension-side chamber R1 in the extension operation needs to be considerably larger than the pressure of the contraction-side chamber R2 in the contraction operation.

In contrast to this, with the extension-side back-pressure chamber Ce and the contraction-side back-pressure chamber Cp of equal pressure, the damper D is configured such that the extension-side load of biasing the extension-side leaf valve Ve becomes larger than the contraction-side load of biasing the contraction-side leaf valve Vp. Compared with a structure where the pressure of the extension-side back-pressure chamber Ce acts on only the back surface of the extension-side leaf valve Ve without the use of the extension-side spool Se, the use of the extension-side spool Se allows the pressure-receiving area of the extension-side spool Se that receives the pressure of the extension-side back-pressure chamber Ce to be larger than a back surface area of the extension-side leaf valve Ve. This ensures causing the larger extension-side load to act on the extension-side leaf valve Ve. Furthermore, with the use of the extension-side spool Se and the contraction-side spool Sp, appropriately configuring the pressure-receiving areas of the respective spools Se and Sp allows freely setting a load difference between the extension-side load and the contraction-side load.

Accordingly, with this damper D, in the case where the extension-side load needs to be considerably increased to adjust the extension-side damping force in the extension operation, increasing the pressure-receiving area of the extension-side spool Se ensures outputting the large extension-side load even if the pressure in the extension-side back-pressure chamber Ce is small. This ensures securing a control width of the extension-side damping force without the use of the large-sized solenoid Sol.

The pressure control of the extension-side back-pressure chamber Ce and the pressure control of the contraction-side back-pressure chamber Cp are performed by driving the one electromagnetic valve valve element 31 and are not performed by driving the respective independent valve elements. Setting the extension-side load large compared with the contraction-side load allows securing the control width of the extension-side damping force even when the extension-side back-pressure chamber Ce communicates with the contraction-side back-pressure chamber Cp. Thus, it is only necessary to provide the one electromagnetic valve valve element 31 at the electromagnetic pressure control valve 6. This ensures considerably simplifying the structure to control the pressures of the respective back-pressure chambers Ce and Cp, ensuring a reduction in production cost of the damper D.

As described above, in addition to ensuring downsizing the solenoid Sol in the electromagnetic pressure control valve 6, the structure of the electromagnetic pressure control valve 6 is also simplified. This reduces the size of the damper D to be large even when the electromagnetic pressure control valve 6 is applied to the piston part of the damper D. This damper D allows the structure of the damper D to be simplified and downsized, ensuring improving mountability to the vehicle. Furthermore, this eliminates the need for providing the large thrust by the solenoid Sol to increase the extension-side damping force. Accordingly, a power consumption to increase the damping force decreases, ensuring power-saving.

The pressure-receiving area of the extension-side spool Se that receives the pressure of the extension-side back-pressure chamber Ce is increased more than the pressure-receiving area of the contraction-side spool Sp that receives the pressure of the contraction-side back-pressure chamber Cp. This allows easily increasing the extension-side load more than the contraction-side load.

The extension-side back-pressure chamber Ce communicates with the contraction-side back-pressure chamber Cp by the communication passage 24 through the extension-side resistance element and the contraction-side resistance element. The contraction-side pressure introduction passage Ip hardly has the resistance and introduces the liquid from the contraction-side chamber R2 to the extension-side back-pressure chamber Ce. Accordingly, when the damper D switches from the extension operation to the contraction operation, the pressure in the contraction-side chamber R2 is quickly introduced to the inside of the extension-side back-pressure chamber Ce. In view of this, the extension-side spool Se presses the extension-side leaf valve Ve according to the pressure in the extension-side back-pressure chamber Ce and the biasing force from the spring member 16. This quickly causes the extension-side leaf valve Ve to be seated on the extension-side valve seat 2d and closes the extension-side passage 3. The extension-side pressure introduction passage Ie also hardly has the resistance and introduces the liquid from the extension-side chamber R1 to the contraction-side back-pressure chamber Cp. Accordingly, when the damper D switches from the contraction operation to the extension operation, the pressure in the extension-side chamber R1 is quickly introduced to the inside of the contraction-side back-pressure chamber Cp. In view of this, the contraction-side spool Sp presses the contraction-side leaf valve Vp according to the pressure in the contraction-side back-pressure chamber Cp and the biasing force from the spring member 20. This quickly causes the contraction-side leaf valve Vp to be seated on the contraction-side valve seat 2c and closes the contraction-side passage 4. Accordingly, with this damper D, even if the extension and contraction velocities are fast and the extension and contraction operations are instantly switched, the closing of the extension-side leaf valve Ve and the contraction-side leaf valve Vp does not delay and this can provide the target damping force from the beginning of the switching of the extension and contraction directions.

The extension-side pressure introduction passage Ie and the contraction-side pressure introduction passage Ip do not include the extension-side resistance element and the contraction-side resistance element such as the orifice. In view of this, due to aged deterioration or a similar defect of the ring plate 19 of the extension-side check valve Te and the ring plate 15 of the contraction-side check valve Tp, even if the respective ring plate 19 and ring plate 15 are not in close contact with the contraction-side chamber 11 and the extension-side chamber 12 and the clearance is generated, a flow rate led through the extension-side pressure introduction passage Ie and the contraction-side pressure introduction passage Ip does not change. Therefore, this does not affect the damping force control and the valve-closing operation at the switching between the extension and contraction.

To the outer peripheral side of the piston rod 7, the piston 2, which includes the extension-side passage 3 and the contraction-side passage 4, the extension-side leaf valve Ve and the contraction-side leaf valve Vp, which are stacked on the piston 2, the tubular extension-side chamber 12 where the extension-side spool Se is slidably inserted into the inner peripheral and forms the extension-side back-pressure chamber Ce, and the tubular contraction-side chamber 11 where the contraction-side spool Sp is slidably inserted into the inner peripheral and forms the contraction-side back-pressure chamber Cp, are mounted. The contraction-side pressure introduction passage Ip is provided at the extension-side chamber 12. The extension-side pressure introduction passage Ie is provided at the contraction-side chamber 11. Thus, with this damper D, the respective members required to adjust the damping force are concentratedly disposed at the piston portion of the damper D.

Furthermore, the one spring member 16 biases the extension-side spool Se to the extension-side leaf valve Ve and biases the ring plate 15 of the contraction-side check valve Tp, which opens and closes the contraction-side pressure introduction passage Ip. The one spring member 20 biases the contraction-side spool Sp to the contraction-side leaf valve Vp and biases the ring plate 19 of the extension-side check valve Te, which opens and closes the extension-side pressure introduction passage Ie. Thus, the one spring members 16 and 20 biases the valve elements of the check valves Te or Tp and recovers the spools Se or Sp to the return side; therefore, the number of components can be reduced.

The piston rod 7 of the damper D includes the holding shaft 8a, the vertical hole 8d, the extension-side pilot orifice Pe and the contraction-side pilot orifice Pp, the housing portion L, the adjustment passage Pc, and the contraction-side discharge passage Ep. The holding shaft 8a is provided at the distal end side of the piston rod 7. The piston 2, the extension-side leaf valve Ve, the contraction-side leaf valve Vp, the extension-side chamber 12, and the contraction-side chamber 11 are mounted to the outer periphery of the holding shaft 8a. The vertical hole 8d opens to the distal end of the holding shaft 8a. The extension-side pilot orifice Pe and the contraction-side pilot orifice Pp are provided at the holding shaft 8a and run to the communication passage 24 provided in the vertical hole 8d. The housing portion L houses the electromagnetic pressure control valve 6. The adjustment passage Pc allows communication between the communication passage 24 and the housing portion L. The contraction-side discharge passage Ep allows communication between the housing portion L and the extension-side chamber R1. The separator 23 is inserted into the vertical hole 8d of the piston rod 7. The separator 23 forms the communication passage 24. The communication passage 24 allows communication between the extension-side back-pressure chamber Ce and the contraction-side back-pressure chamber Cp inside the vertical hole 8d by the ring groove 23a provided on the outer periphery of the separator 23. The separator 23 forms the extension-side discharge passage Ee on the inner peripheral. This configuration ensures effortlessly housing the electromagnetic pressure control valve 6 inside the piston rod 7. This also ensures disposing the extension-side back-pressure chamber Ce and the contraction-side back-pressure chamber Cp on the outer periphery of the piston rod 7. The extension-side back-pressure chamber Ce and the contraction-side back-pressure chamber Cp are axially displaced from the electromagnetic pressure control valve 6.

Furthermore, the electromagnetic pressure control valve 6 is configured to perform the pressure control during the energization and close the adjustment passage Pc during the non-energization. The adjustment passage Pc includes the fail valve FV, which bypasses the electromagnetic pressure control valve 6. The valve opening pressure of the fail valve FV is configured larger than the maximum control pressure by the electromagnetic pressure control valve 6. Accordingly, at the fail, the extension-side load and the contraction-side load become the maximum. The damper D can provide the largest damping force, thereby ensuring stabilizing the vehicle body posture even during the fail.

It should be noted that, when the electromagnetic pressure control valve 6 takes the shutoff position, the small-diameter portion 31a of the electromagnetic valve valve element 31 is opposed to the through hole 30c to obstruct the through hole 30c. Instead of this, with the shutoff position, the through hole 30c may not be fully obstructed and the concave portion 31c may be slightly opposed to the through hole 30c to function the concave portion 31c as a throttle valve. Even during the fail where the electromagnetic pressure control valve 6 is in the shutoff position, this configuration allows reducing the damping force at a low piston speed. Consequently, this ensures improving the ride comfort in the vehicle even in the fail.

Furthermore, the electromagnetic pressure control valve 6 includes the valve seat member 30 and the electromagnetic valve valve element 31. The valve seat member 30 includes the tubular valve housing tube 30a and the ring-shaped control valve valve seat 30d. The through hole 30c, which is a part of the adjustment passage Pc, is formed at the valve housing tube 30a.

The control valve valve seat 30d is provided at the end portion of the valve housing tube 30a. The electromagnetic valve valve element 31 includes the small-diameter portion 31a, the large-diameter portion 31b, and the concave portion 31c. The small-diameter portion 31a is slidably inserted into the valve housing tube 30a. The large-diameter portion 31b has the outer diameter larger than that of the small-diameter portion 31a. The large-diameter portion 31b has the end portion, which separates from and is seated on the control valve valve seat 30d. The concave portion 31c is provided between the small-diameter portion 31a and the large-diameter portion 31b and can be opposed to the through hole 30c. When the small-diameter portion 31a of the electromagnetic valve valve element 31 is opposed to the through hole 30c of the valve seat member 30, the adjustment passage Pc is cutoff. The area that receives the pressure acting in the direction that the electromagnetic valve valve element 31 is pushed out from the valve seat member 30 is the area found by subtracting the area of the circle with the outer diameter of the small-diameter portion 31a as the diameter from the area of the circle with the inner diameter of the control valve valve seat 30d as the diameter. Thus, the area that receives the pressure acting in the direction that the electromagnetic valve valve element 31 is pushed out can be reduced, and the flow passage area while the valve is open can be increased. This ensures the stable movement of the electromagnetic valve valve element 31. At the shutoff position where the outer periphery of the small-diameter portion 31a is opposed to the through hole 30c to obstruct the through hole 30c, the valve-closed state is maintained regardless of the upstream side pressure. This makes it possible to enable only the fail valve FV.

It should be noted that, the above-described configuration of the biasing mechanism is one example; therefore, this should not be constructed in a limiting sense. The embodiment describes the case where the damping valve according to the embodiment of the present invention is applied to both the extension-side damping valve and the contraction-side damping valve. However, the damping valve according to the embodiment may be applied to only any one of the extension-side damping valve and the contraction-side damping valve. The damping valve according to the embodiment of the present invention is not limited to the damping valve provided at the piston portion of the damper. The damping valve may be applied to a damping valve provided at a base valve (not illustrated).

Embodiments of the present invention were described above, but the above embodiments are merely examples of applications of the present invention, and the technical scope of the present invention is not limited to the specific constitutions of the above embodiments.

This application claims priority based on Japanese Patent Application No. 2014-237849 filed with the Japan Patent Office on Nov. 25, 2014, the entire contents of which are incorporated into this specification.

The invention claimed is:

1. A damping valve, comprising:
a valve disc that includes a passage for a fluid and a valve seat, the valve seat surrounding an exit end of the passage;
a ring-shaped leaf valve stacked on the valve disc, the leaf valve separating from and being seated on the valve seat to open and close the passage; and
a biasing mechanism configured to cause a variable biasing force to act on the leaf valve toward the valve disc side, wherein:
a clearance is formed between the leaf valve and the valve seat in a state in which the leaf valve is stacked on the valve disc with no load, and
the leaf valve is configured to retreat as a whole in an axial direction with respect to the valve disc, by a pressure of the fluid in the passage, a retreating of the leaf valve causing a size of the clearance to enlarge.

2. The damping valve according to claim 1, further comprising
a plate stacked on the leaf valve on a side opposite to the valve disc side, the plate being configured to axially retreat with respect to the valve disc together with the leaf valve, the plate having a rigidity higher than a rigidity of the leaf valve.

3. The damping valve according to claim 2, wherein
the leaf valve and the plate have a ring shape, and
the damping valve further comprises:
 a shaft member provided with the leaf valve and the plate mounted on an outer periphery of the shaft member in a manner freely movable in an axial direction; and
 a stopper stacked on the shaft member, the stopper restricting an amount of retreat of the leaf valve and the plate from the valve disc.

4. The damping valve according to claim 1, further comprising
a ring spacer interposed between an inner peripheral seat of the valve disc and the leaf valve, the inner peripheral seat being provided inside with respect to the passage of the valve disc, wherein
one or a plurality of the ring spacers are provided.

5. A damper comprising:
a cylinder,
the damping valve according to claim 1 housed in the cylinder;
an extension-side chamber and a contraction-side chamber partitioned in the cylinder by the valve disc; and
a piston rod movably inserted into the cylinder, the piston rod being coupled to the valve disc, wherein
the passage allows communication between the extension-side chamber and the contraction-side chamber.

6. The damper according to claim 5, wherein
the biasing mechanism biases the leaf valve using one or both pressures of the extension-side chamber and the contraction-side chamber.

7. A damper comprising:
a cylinder;
a damping valve housed in the cylinder, the damping valve comprising
 a valve disc that includes a passage for a fluid and a valve seat, the valve seat surrounding an exit end of the passage,
 a ring-shaped leaf valve stacked on the valve disc, the leaf valve separating from and being seated on the valve seat to open and close the passage, and
 a biasing mechanism configured to cause a variable biasing force to act on the leaf valve toward the valve disc side, wherein
 a clearance is formed between the leaf valve and the valve seat in a state in which the leaf valve is stacked on the valve disc with no load, and
 the leaf valve is configured to retreat as a whole in an axial direction with respect to the valve disc, by a pressure of the fluid in the passage, a retreating of the leaf valve causing a size of the clearance to enlarge;
an extension-side chamber and a contraction-side chamber partitioned in the cylinder by the valve disc; and
a piston rod movably inserted into the cylinder, the piston rod being coupled to the valve disc,
wherein
the passage allows communication between the extension-side chamber and the contraction-side chamber;
the passage includes an extension-side passage and a contraction-side passage that allow communication between the extension-side chamber and the contraction-side chamber;
the valve seat includes an extension-side valve seat and a contraction-side valve seat, the extension-side valve seat surrounding an exit end of an extension-side passage and the contraction-side valve seat surrounding an exit end of a contraction-side passage;
the leaf valve includes an extension-side leaf valve and a contraction-side leaf valve, the extension-side leaf valve opening and closing the extension-side passage, the contraction-side leaf valve opening and closing the contraction-side passage;
the biasing mechanism includes:
 an extension-side spool configured to bias the extension-side leaf valve,
 an extension-side back-pressure chamber configured to press the extension-side spool by internal pressure,
 a contraction-side spool configured to bias the contraction-side leaf valve, a contraction-side back-pressure chamber configured to press the contraction side spool by internal pressure, a communication passage communicated with the contraction-side back-pressure chamber via an extension-side resistance element configured to impart a resistance to a flow of passing liquid, the communication passage being communicated with the extension-side back-pressure chamber via a contraction-side resistance element configured to impart a resistance to a flow of passing liquid, an extension-side pressure introduction passage configured to accept only a flow of liquid heading from the extension-side chamber to the contraction-side back-pressure chamber, a contraction-side pressure introduction passage configured to accept only a flow of liquid heading from the contraction-side chamber to the extension-side back-pressure chamber, an adjustment passage connected to the communication passage, a contraction-side discharge passage that allows communication between a downstream of the adjustment passage and the extension-side chamber, the contraction side discharge passage being configured to accept only a flow of liquid heading from the adjustment passage to the extension-side chamber, an extension-side discharge passage that allows communication between the downstream of the adjustment passage and the contraction-side chamber, the extension side discharge passage being configured to accept only a flow of liquid heading from the adjustment passage to the contraction-side chamber, and an electromagnetic pressure control valve provided at the adjustment passage and configured to control upstream pressure of the adjustment passage; and an extension-side load is larger than a contraction-side load when the pressure in the extension-side back-pressure chamber is equal to the pressure in the contraction-side back pressure chamber, the extension-side load biasing the extension-side leaf valve by the pressure of the extension-side back-pressure chamber, the contraction-side load biasing the contraction side leaf valve by the pressure of the contraction-side back-pressure chamber.

8. The damper according to claim 7, wherein the extension-side spool has a pressure-receiving area that receives the pressure of the extension-side back-pressure chamber larger than a pressure-receiving area of the contraction-side spool that receives the pressure of the contraction-side back-pressure chamber.

* * * * *